United States Patent
Sapugay et al.

(10) Patent No.: US 11,741,309 B2
(45) Date of Patent: *Aug. 29, 2023

(54) TEMPLATED RULE-BASED DATA AUGMENTATION FOR INTENT EXTRACTION

(71) Applicant: ServiceNow, Inc., Santa Clara, CA (US)

(72) Inventors: Edwin Sapugay, Foster City, CA (US); Anil Kumar Madamala, Sunnyvale, CA (US); Maxim Naboka, Santa Clara, CA (US); Srinivas SatyaSai Sunkara, Santa Clara, CA (US); Lewis Savio Landry Santos, Santa Clara, CA (US); Murali B. Subbarao, Saratoga, CA (US)

(73) Assignee: ServiceNow, Inc., Santa Clara, CA (US)

( * ) Notice: Subject to any disclaimer, the term of this patent is extended or adjusted under 35 U.S.C. 154(b) by 144 days.

This patent is subject to a terminal disclaimer.

(21) Appl. No.: 17/301,092

(22) Filed: Mar. 24, 2021

(65) Prior Publication Data
US 2021/0224485 A1    Jul. 22, 2021

Related U.S. Application Data

(63) Continuation of application No. 16/239,218, filed on Jan. 3, 2019, now Pat. No. 10,970,487.
(Continued)

(51) Int. Cl.
*G06F 40/30* (2020.01)
*G06N 20/00* (2019.01)
(Continued)

(52) U.S. Cl.
CPC ............ *G06F 40/30* (2020.01); *G06F 40/205* (2020.01); *G06F 40/211* (2020.01); *G06N 5/022* (2013.01);
(Continued)

(58) Field of Classification Search
CPC ...... G06F 40/30; G06F 40/205; G06F 40/211; G06N 5/022; G06N 20/00; G06N 3/006;
(Continued)

(56) References Cited

U.S. PATENT DOCUMENTS

| | | |
|---|---|---|
| 6,609,122 B1 | 8/2003 | Ensor |
| 7,020,706 B2 | 3/2006 | Cates |

(Continued)

*Primary Examiner* — Abul K Azad
(74) *Attorney, Agent, or Firm* — Fletcher Yoder PC

(57) ABSTRACT

An agent automation system includes a memory configured to store a natural language understanding (NLU) framework and a model, wherein the model includes at least one original meaning representation. The system includes a processor configured to execute instructions of the NLU framework to cause the agent automation system to perform actions including: performing rule-based generalization of the model to generate at least one generalized meaning representation of the model from the at least one original meaning representation of the model; performing rule-based refinement of the model to prune or modify the at least one generalized meaning representation of the model, or the at least one original meaning representation of the model, or a combination thereof; and after performing the rule-based generalization and the rule-based refinement of the model, using the model to extract intents/entities from a received user utterance.

20 Claims, 17 Drawing Sheets

Related U.S. Application Data

(60) Provisional application No. 62/659,710, filed on Apr. 19, 2018, provisional application No. 62/657,751, filed on Apr. 14, 2018, provisional application No. 62/652,903, filed on Apr. 5, 2018, provisional application No. 62/646,917, filed on Mar. 23, 2018, provisional application No. 62/646,915, filed on Mar. 23, 2018, provisional application No. 62/646,916, filed on Mar. 23, 2018.

(51) Int. Cl.
  *G10L 15/19* (2013.01)
  *G10L 15/22* (2006.01)
  *G06N 5/022* (2023.01)
  *G06F 40/205* (2020.01)
  *G06F 40/211* (2020.01)
  *G10L 15/18* (2013.01)
  *G10L 15/16* (2006.01)

(52) U.S. Cl.
  CPC .............. *G06N 20/00* (2019.01); *G10L 15/19* (2013.01); *G10L 15/22* (2013.01); *G10L 15/16* (2013.01); *G10L 15/1807* (2013.01); *G10L 15/1822* (2013.01); *G10L 2015/223* (2013.01); *G10L 2015/225* (2013.01)

(58) Field of Classification Search
  CPC ......... G06N 5/025; G10L 15/19; G10L 15/22; G10L 15/16; G10L 15/1807; G10L 15/1822; G10L 2015/223; G10L 2015/225; G10L 25/48
  See application file for complete search history.

(56) References Cited

U.S. PATENT DOCUMENTS

| | | | |
|---|---|---|---|
| 7,028,301 B2 | 4/2006 | Ding | |
| 7,062,683 B2 | 6/2006 | Warpenburg | |
| 7,131,037 B1 | 10/2006 | LeFaive | |
| 7,170,864 B2 | 1/2007 | Matharu | |
| 7,350,209 B2 | 3/2008 | Shum | |
| 7,509,653 B2 | 3/2009 | Das et al. | |
| 7,610,512 B2 | 10/2009 | Gerber | |
| 7,617,073 B2 | 11/2009 | Trinon | |
| 7,617,500 B2 | 11/2009 | Astl et al. | |
| 7,630,784 B2 | 12/2009 | Hunt et al. | |
| 7,653,650 B2 | 1/2010 | Kulkarni et al. | |
| 7,689,628 B2 | 3/2010 | Garg | |
| 7,783,744 B2 | 8/2010 | Garg | |
| 7,849,201 B1 | 12/2010 | Subbarao et al. | |
| 7,890,802 B2 | 2/2011 | Gerber | |
| 7,930,396 B2 | 4/2011 | Trinon | |
| 8,006,240 B2 | 4/2011 | Bhatkhande et al. | |
| 7,945,860 B2 | 5/2011 | Vambenepe | |
| 7,958,031 B2 | 6/2011 | Hunt et al. | |
| 7,966,398 B2 | 6/2011 | Wiles | |
| 7,971,147 B2 | 6/2011 | Subbarao et al. | |
| 8,051,164 B2 | 11/2011 | Peuter | |
| 8,112,354 B2 | 2/2012 | Lalwani et al. | |
| 8,156,479 B2 | 4/2012 | Fong et al. | |
| 8,224,683 B2 | 7/2012 | Manos | |
| 8,266,096 B2 | 9/2012 | Navarrete | |
| 8,433,654 B2 | 4/2013 | Subbarao et al. | |
| 8,457,928 B2 | 6/2013 | Dang | |
| 8,473,361 B2 | 6/2013 | Subbarao et al. | |
| 8,478,569 B2 | 7/2013 | Scarpelli | |
| 8,612,289 B2 | 12/2013 | Subbarao et al. | |
| 8,650,078 B2 | 2/2014 | Subbarao et al. | |
| 8,674,992 B2 | 3/2014 | Poston | |
| 8,689,241 B2 | 4/2014 | Naik | |
| 8,743,121 B2 | 6/2014 | De Peuter | |
| 8,887,133 B2 | 11/2014 | Behnia | |
| 9,065,783 B2 | 6/2015 | Ding | |
| 9,122,552 B2 | 9/2015 | Whitney | |
| 9,239,857 B2 | 1/2016 | Trinon | |
| 9,535,737 B2 | 1/2017 | Joy | |
| 9,557,969 B2 | 1/2017 | Sharma | |
| 9,626,717 B2 | 4/2017 | Sapugay et al. | |
| 9,633,004 B2 | 4/2017 | Giuli et al. | |
| 9,792,387 B2 | 10/2017 | George | |
| 9,911,413 B1 | 3/2018 | Kumar | |
| 10,970,487 B2* | 4/2021 | Sapugay | G10L 15/22 |
| 2006/0130038 A1 | 6/2006 | Claussen et al. | |
| 2007/0261065 A1 | 11/2007 | Astl et al. | |
| 2008/0075444 A1 | 3/2008 | Subbarao et al. | |
| 2008/0184164 A1 | 7/2008 | Di Fabbrizio | |
| 2011/0119047 A1* | 5/2011 | Ylonen | G06F 40/30 704/9 |
| 2012/0246073 A1 | 9/2012 | Gore et al. | |
| 2012/0290938 A1 | 11/2012 | Subbarao et al. | |
| 2014/0278435 A1 | 9/2014 | Ganong, III | |
| 2014/0279274 A1 | 9/2014 | Subbarao et al. | |
| 2014/0297457 A1 | 10/2014 | Sapugay et al. | |
| 2014/0297458 A1 | 10/2014 | Sapugay et al. | |
| 2014/0316764 A1 | 10/2014 | Ayan | |
| 2015/0269573 A1 | 9/2015 | Subbarao et al. | |
| 2016/0070696 A1 | 3/2016 | Lavallee | |
| 2017/0212886 A1 | 7/2017 | Sarikaya | |
| 2018/0293221 A1* | 10/2018 | Finkelstein | G06N 20/00 |
| 2018/0329878 A1 | 11/2018 | Hirzel | |
| 2019/0212879 A1* | 7/2019 | Anand | G06Q 50/10 |
| 2019/0259380 A1 | 8/2019 | Biyani | |

* cited by examiner

TEMPLATED RULE-BASED DATA AUGMENTATION FOR INTENT EXTRACTION

CROSS-REFERENCE

This application is a continuation of U.S. patent application Ser. No. 16/239,218, entitled "TEMPLATED RULE-BASED DATA AUGMENTATION FOR INTENT EXTRACTION," filed Jan. 3, 2019, issuing as U.S. Pat. No. 10,970,487 on Apr. 6, 2021, which claims priority from and the benefit of U.S. Provisional Application No. 62/646,915, entitled "HYBRID LEARNING SYSTEM FOR NATURAL LANGUAGE UNDERSTANDING," filed Mar. 23, 2018; U.S. Provisional Application No. 62/646,916, entitled "VOCABULARY MANAGEMENT IN A NATURAL LEARNING FRAMEWORK," filed Mar. 23, 2018; U.S. Provisional Application No. 62/646,917, entitled "METHOD AND SYSTEM FOR AUTOMATED INTENT MINING, CLASSIFICATION AND DISPOSITION," filed Mar. 23, 2018; U.S. Provisional Application No. 62/657,751, entitled "METHOD AND SYSTEM FOR FOCUSED CONVERSATION CONTEXT MANAGEMENT IN A BEHAVIOR ENGINE," filed Apr. 14, 2018; U.S. Provisional Application No. 62/652,903, entitled "TEMPLATED RULE-BASED DATA AUGMENTATION FOR INTENT EXTRACTION FROM SPARSE DATA," filed Apr. 5, 2018; and U.S. Provisional Application No. 62/659,710, entitled "WRITTEN-MODALITY PROSODY SUBSYSTEM IN A NLU FRAMEWORK," filed Apr. 19, 2018, which are incorporated by reference herein in their entirety for all purposes.

BACKGROUND

The present disclosure relates generally to the fields of natural language understanding (NLU) and artificial intelligence (AI), and more specifically, to data augmentation within a NLU system.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations and these resources may be used to perform a variety computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

In modern communication networks, examples of cloud computing services a user may utilize include so-called infrastructure as a service (IaaS), software as a service (SaaS), and platform as a service (PaaS) technologies. IaaS is a model in which providers abstract away the complexity of hardware infrastructure and provide rapid, simplified provisioning of virtual servers and storage, giving enterprises access to computing capacity on demand. In such an approach, however, a user may be left to install and maintain platform components and applications. SaaS is a delivery model that provides software as a service rather than an end product. Instead of utilizing a local network or individual software installations, software is typically licensed on a subscription basis, hosted on a remote machine, and accessed by client customers as needed. For example, users are generally able to access a variety of enterprise and/or information technology (IT)-related software via a web browser. PaaS acts an extension of SaaS that goes beyond providing software services by offering customizability and expandability features to meet a user's needs. For example, PaaS can provide a cloud-based developmental platform for users to develop, modify, and/or customize applications and/or automating enterprise operations without maintaining network infrastructure and/or allocating computing resources normally associated with these functions.

Such a cloud computing service may host a virtual agent, such as a chat agent, that is designed to automatically respond to issues with the client instance based on natural language requests from a user of the client instance. For example, a user may provide a request to a virtual agent for assistance with a password issue, wherein the virtual agent is part of a Natural Language Processing (NLP) or Natural Language Understanding (NLU) system. NLP is a general area of computer science and AI that involves some form of processing of natural language input. Examples of areas addressed by NLP include language translation, speech generation, parse tree extraction, part-of-speech identification, and others. NLU is a sub-area of NLP that specifically focuses on understanding user utterances. Examples of areas addressed by NLU include question-answering (e.g., reading comprehension questions), article summarization, and others. For example, a NLU may use algorithms to reduce human language (e.g., spoken or written) into a set of known symbols for consumption by a downstream virtual agent.

It is presently recognized that there is a need to improve the ability of virtual agents to apply NLU techniques to properly derive meaning from complex natural language utterances. For example, it may be advantageous to create a virtual agent capable of comprehending complex language and executing contextually relevant requests, which could afford substantial advantages in terms of reduced operational cost and increased responsiveness to client issues. Additionally, it is recognized that it is advantageous for virtual agents to be customizable and adaptable to various communication channels and styles.

Additionally, in the context of NLU and AI, it is recognized that data augmentation can add value to base data by adding information derived from internal and external sources within an enterprise. For example, data augmentation can help reduce manual intervention involved in developing meaningful information and insight from business data, as well as significantly enhance data quality. There are many approaches to augment data, for instance, adding noise or applying transformations on existing data and simulation of data. However, it is presently recognized that data augmentation can become increasingly challenging as the complexity of data increases. With this in mind, there appears to be a need to improve methods of applying semantic techniques for data augmentation within a NLU framework.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Present embodiments are directed to an agent automation framework that is capable of extracting meaning from user utterances, such as requests received by a virtual agent (e.g., a chat agent), and suitably responding to these user utterances. To do this, the agent automation framework includes a NLU framework and an intent/entity model having defined intents and entities that are associated with sample utterances. The NLU framework includes a meaning extraction subsystem that is designed to generate meaning representations for the sample utterances of the intent/entity model to generate an understanding model, and designed to generate meaning representations for a received user utterance to generate an utterance meaning model. Additionally, the disclosed NLU framework includes a meaning search subsystem that is designed to search the meaning representations of the intent/entity model to locate matches for a meaning representation of a received user utterance. As such, present embodiments generally address the hard problem posed by NLU by transforming it into a manageable search problem.

In present embodiments, a meaning representation can be generated from an annotated utterance tree structure having a form or shape that represents the grammatical structures of the utterance, and having nodes that each represent words or phrases of the utterances as word vectors encoding the semantic meaning of the utterance. In particular, the meaning extraction subsystem of the disclosed NLU framework includes a vocabulary subsystem, a structure subsystem, and a prosody subsystem that cooperate to parse utterances (e.g., received user utterances, sample utterances of the intent/entity model) into the annotated utterance trees based on combinations of rule-based methods and machine learning (ML)-based (e.g., statistical) methods.

The disclosed NLU framework also includes a model augmentation subsystem capable of performing rule-based augmentation to augment a model (e.g., the utterance meaning model and/or the understanding model) by generalizing and/or refining the model. For example, the disclosed NLU framework is capable of expanding a number of meaning representations in the model based on stored generalizing rules, wherein the additional meaning representations are re-expressions of the original meaning representations of the model. The disclosed NLU framework is also capable of refining the meaning representations of these models, for example, to prune substantially similar meaning representations from the model based on stored refining rules. Additionally, refining may also include applying substitution rules that modify meaning representations by replacing one word surface or phrasal form with another that may be more common in a given conversational style, discourse, or channel. As such, the disclosed technique enables the generation of an augmented understanding model and/or augmented utterance meaning model having generalized and/or refined meaning representations. By expanding and/or refining the understanding model and/or the utterance model, the disclosed augmentation techniques enable the NLU framework and the agent automation system to be more robust to variations and idiosyncrasies in discourse styles and to nuances in word surface form and usage. The disclosed techniques can also improve the operation of the NLU framework and agent automation system by reducing or optimizing processing and memory resource usage when deriving meaning from natural language utterances.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
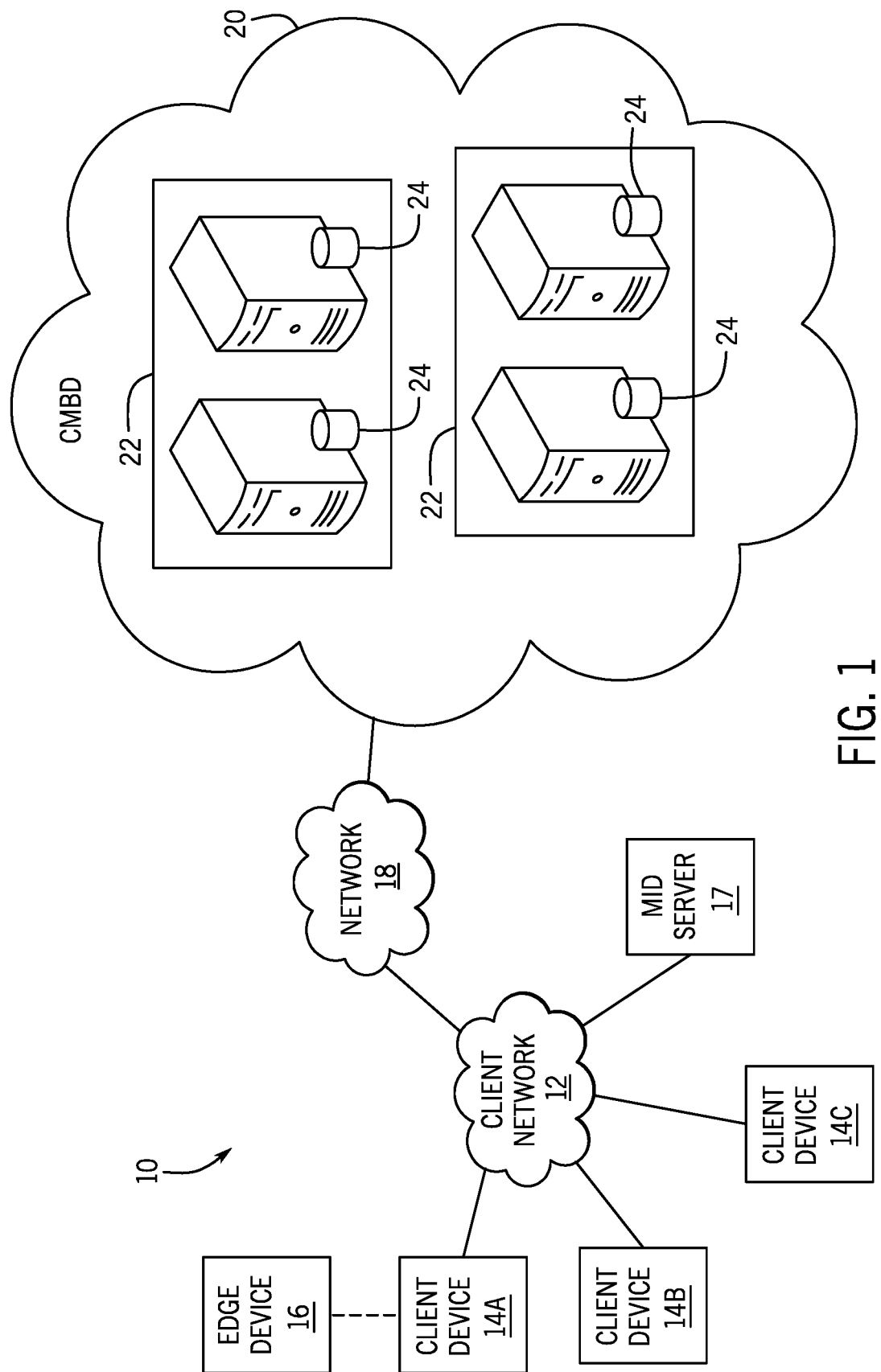
FIG. 1 is a block diagram of an embodiment of a cloud computing system in which embodiments of the present technique may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" or "computing device" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "machine-readable medium" may include a single medium or multiple media (e.g., a centralized or distributed database, and/or associated caches and servers) that store one or more instructions or data structures. The term "non-transitory machine-readable medium" shall also be taken to include any tangible medium that is capable of storing, encoding, or carrying instructions for execution by the computing system and that cause the computing system to perform any one or more of the methodologies of the present subject matter, or that is capable of storing, encoding, or carrying data structures utilized by or associated with such instructions. The term "non-transitory machine-readable medium" shall accordingly be taken to include, but not be limited to, solid-state memories, and optical and magnetic media. Specific examples of non-transitory machine-readable media include, but are not limited to, non-volatile memory, including by way of example, semiconductor memory devices (e.g., Erasable Programmable Read-Only Memory (EPROM), Electrically Erasable Programmable Read-Only Memory (EEPROM), and flash memory devices), magnetic disks such as internal hard disks and removable disks, magneto-optical disks, and CD-ROM and DVD-ROM disks.

As used herein, the terms "application" and "engine" refer to one or more sets of computer software instructions (e.g., computer programs and/or scripts) executable by one or more processors of a computing system to provide particular functionality. Computer software instructions can be written in any suitable programming languages, such as C, C++, C#, Pascal, Fortran, Perl, MATLAB, SAS, SPSS, JavaScript, AJAX, and JAVA. Such computer software instructions can comprise an independent application with data input and data display modules. Alternatively, the disclosed computer software instructions can be classes that are instantiated as distributed objects. The disclosed computer software instructions can also be component software, for example JAVABEANS or ENTERPRISE JAVABEANS. Additionally, the disclosed applications or engines can be implemented in computer software, computer hardware, or a combination thereof.

As used herein, the term "framework" refers to a system of applications and/or engines, as well as any other supporting data structures, libraries, modules, and any other supporting functionality, that cooperate to perform one or more overall functions. In particular, a "natural language understanding framework" or "NLU framework" comprises a collection of computer programs designed to process and derive meaning (e.g., intents, entities) from natural language utterances based on an intent/entity model. As used herein, a "reasoning agent/behavior engine" or "RA/BE" refers to a rule-based agent, such as a virtual assistant, designed to interact with other agents based on a conversation model. For example, a "virtual agent" may refer to a particular example of a RA/BE that is designed to interact with users via natural language requests in a particular conversational or communication channel. By way of specific example, a virtual agent may be or include a chat agent that interacts with users via natural language requests and responses in a chat room environment. Other examples of virtual agents may include an email agent, a forum agent, a ticketing agent, a telephone call agent, and so forth, which interact with users in the context of email, forum posts, and autoreplies to service tickets, phone calls, and so forth.

As used herein, an "intent" refers to a desire or goal of an agent which may relate to an underlying purpose of a communication, such as an utterance. As used herein, an "entity" refers to an object, subject, or some other parameterization of an intent. It is noted that certain entities are treated as parameters of a corresponding intent and are stored within the intent namespace; however, certain generic entities (e.g., location, time) may be stored independently from intents in a global namespace. As used herein, an "intent/entity model" refers to an intent model that associates particular intents with particular sample utterances, wherein certain entity data may be encoded as a parameter of the intent within the model. As used herein, the term "agents" may refer to computer-generated personas (e.g. chat agents or other virtual agents) that interact with one another within a conversational channel. As used herein, a "corpus" refers to a captured body of source data that includes interactions between various users and virtual agents, wherein the interactions include communications or conversations within one or more suitable types of media (e.g., a help line, a chat room or message string, an email string). As used herein, "source data" may include any suitable captured interactions between various agents, including but not limited to, chat logs, email strings, documents, help documentation, frequently asked questions (FAQs), forum entries, items in support ticketing, recordings of help line calls, and so forth. As used herein, an "utterance" refers to a single natural language statement made by a user or agent that may include one or more intents. As such, an utterance may be part of a previously captured corpus of source data, and an utterance may also be a new statement received from a user as part of an interaction with a virtual agent.

As used herein, "machine learning" or "ML" may be used to refer to any suitable statistical form of artificial intelligence capable of being trained using supervised learning, such as a neural network (NN) (e.g., a deep neural network (DNN), a recurrent neural network (RNN), a recursive neural network). As used herein, a "vector" (e.g., a word vector, an intent vector, a subject vector, a subtree vector) refers to a linear algebra vector that is an ordered n-dimensional list (e.g., a 300 dimensional list) of floating point values (e.g., a 1×N or an N×1 matrix) that provides a mathematical representation of the semantic meaning of a portion (e.g., a word or phrase, an intent, an entity) of an utterance.

As used herein, the term "augmented" or "augmentation" in the context of a model (e.g., an utterance meaning model or an understanding model) refers to a model that has undergone generalization and/or refinement. As used herein, "generalize" or "generalization" in the context of a model (e.g., an utterance meaning model or an understanding model) refers to a rule-based process whereby a meaning representation can be used to generate a set of related meaning representations, referred to herein as "generalized meaning representations," that are re-expressions of the original meaning representation. As used herein, "refine" or "refinement" in the context of a model (e.g., an utterance meaning model or an understanding model) refers to a rule-based process whereby meaning representations of the model are refined (e.g., modified or pruned) to generate a set of related meaning representations, referred to herein as "refined meaning representations."

As mentioned, a computing platform may include a chat agent, or another similar virtual agent, that is designed to automatically respond to user requests to perform functions or address issues on the platform. For example, a user may provide a request to a virtual agent for assistance with a password issue, wherein the virtual agent is part of a Natural Language Processing (NLP) or Natural Language Understanding (NLU) system. NLP is a general area of computer science and AI that involves some form of processing of natural language input. Examples of areas addressed by NLP include language translation, speech generation, parse tree extraction, part-of-speech identification, and others. NLU is a sub-area of NLP that specifically focuses on understanding user utterances. Examples of areas addressed by NLU include question-answering (e.g., reading comprehension questions), article summarization, and others. For example, a NLU may use algorithms to reduce human language (e.g., spoken or written) into a set of known symbols for consumption by a downstream virtual agent. NLP is generally used to interpret free text for further analysis. Current approaches to NLP are typically based on deep learning, which is a type of AI that examines and uses patterns in data to improve the understanding of a program.

With the foregoing in mind, present embodiments are directed to an agent automation system having a NLU framework that enables data augmentation of models, such as utterance meaning models and understanding models used by the NLU framework to extract intent/entities from received natural language utterances. More specifically, the disclosed NLU framework also includes a model augmentation subsystem capable of performing rule-based augmentation to expand and/or refine the models. For example, the disclosed NLU framework is capable of expanding a number of meaning representations in the model based on stored generalizing rules, wherein the additional meaning representations are re-expressions of the original meaning representations of the model. The disclosed NLU framework is also capable of refining the model by focusing the meaning representations, for example, to remove substantially similar meaning representations and/or modify meaning representations of the model based on stored refining rules. As such, the disclosed technique enables the generation of an augmented understanding model and/or augmented utterance meaning model having generalized and/or refined meaning representations. By expanding and/or focusing the understanding model and/or the utterance model, the disclosed augmentation techniques enable the NLU framework and the agent automation system to be more robust to variations and idiosyncrasies in discourse styles and to nuances in word surface form and usage (e.g., polysemy). The disclosed techniques can also improve the operation of the NLU framework and agent automation system by reducing or optimizing processing and memory resource usage when deriving meaning from natural language utterances.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a computing system 10, such as a cloud computing system, where embodiments of the present disclosure may operate, is illustrated. Computing system 10 may include a client network 12, network 18 (e.g., the Internet), and a cloud-based platform 20. In some implementations, the cloud-based platform may host a management database (CMDB) system and/or other suitable systems. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 22, and/or other remote networks. As shown in FIG. 1, the client network 12 is able to connect to one or more client devices 14A, 14B, and 14C so that the client devices are able to communicate with each other and/or with the network hosting the platform 20. The client devices 14A-C may be computing systems and/or other types of computing devices generally referred to as Internet of Things (IoT) devices that access cloud computing services, for example, via a web browser application or via an edge device 16 that may act as a gateway between the client devices and the platform 20. FIG. 1 also illustrates that the client network 12 includes an administration or managerial device or server, such as a management, instrumentation, and discovery (MID) server 17 that facilitates communication of data between the network hosting the platform 20, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 18. The network 18 may include one or more computing networks, such as other LANs, wide area networks (WAN), the Internet, and/or other remote networks, to transfer data between the client devices 14A-C and the network hosting the platform 20. Each of the computing networks within network 18 may contain wired and/or wireless programmable devices that operate in the electrical and/or optical domain. For example, network 18 may include wireless networks, such as cellular networks (e.g., Global System for Mobile Communications (GSM) based cellular network), IEEE 802.11 networks, and/or other suitable radio-based networks. The network 18 may also employ any number of network communication protocols, such as Transmission Control Protocol (TCP) and Internet Protocol (IP). Although not explicitly shown in FIG. 1, network 18 may include a variety of network devices, such as servers, routers, network switches, and/or other network hardware devices configured to transport data over the network 18.

In FIG. 1, the network hosting the platform 20 may be a remote network (e.g., a cloud network) that is able to communicate with the client devices 14A-C via the client network 12 and network 18. The network hosting the platform 20 provides additional computing resources to the client devices 14A-C and/or client network 12. For example, by utilizing the network hosting the platform 20, users of client devices 14A-C are able to build and execute applications for various enterprise, IT, and/or other organization-related functions. In one embodiment, the network hosting the platform 20 is implemented on one or more data centers 22, where each data center could correspond to a different geographic location. Each of the data centers 22 includes a plurality of virtual servers 24 (also referred to herein as application nodes, application servers, virtual server instances, application instances, or application server instances), where each virtual server can be implemented on a physical computing system, such as a single electronic computing device (e.g., a single physical hardware server) or across multiple-computing devices (e.g., multiple physical hardware servers). Examples of virtual servers 24 include, but are not limited to a web server (e.g., a unitary web server installation), an application server (e.g., unitary JAVA Virtual Machine), and/or a database server, e.g., a unitary relational database management system (RDBMS) catalog.

To utilize computing resources within the platform 20, network operators may choose to configure the data centers 22 using a variety of computing infrastructures. In one embodiment, one or more of the data centers 22 are configured using a multi-tenant cloud architecture, such that one of the server instances 24 handles requests from and serves multiple customers. Data centers with multi-tenant cloud architecture commingle and store data from multiple customers, where multiple customer instances are assigned to one of the virtual servers 24. In a multi-tenant cloud architecture, the particular virtual server 24 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 24 causing outages for all customers allocated to the particular server instance.

In another embodiment, one or more of the data centers 22 are configured using a multi-instance cloud architecture to provide every customer its own unique customer instance or instances. For example, a multi-instance cloud architecture could provide each customer instance with its own dedicated application server(s) and dedicated database server(s). In other examples, the multi-instance cloud architecture could deploy a single physical or virtual server and/or other combinations of physical and/or virtual servers 24, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 20, and customer-driven upgrade schedules. An example of implementing a customer instance within a multi-instance cloud architecture will be discussed in more detail below with reference to FIG. 2.

Figure 2:
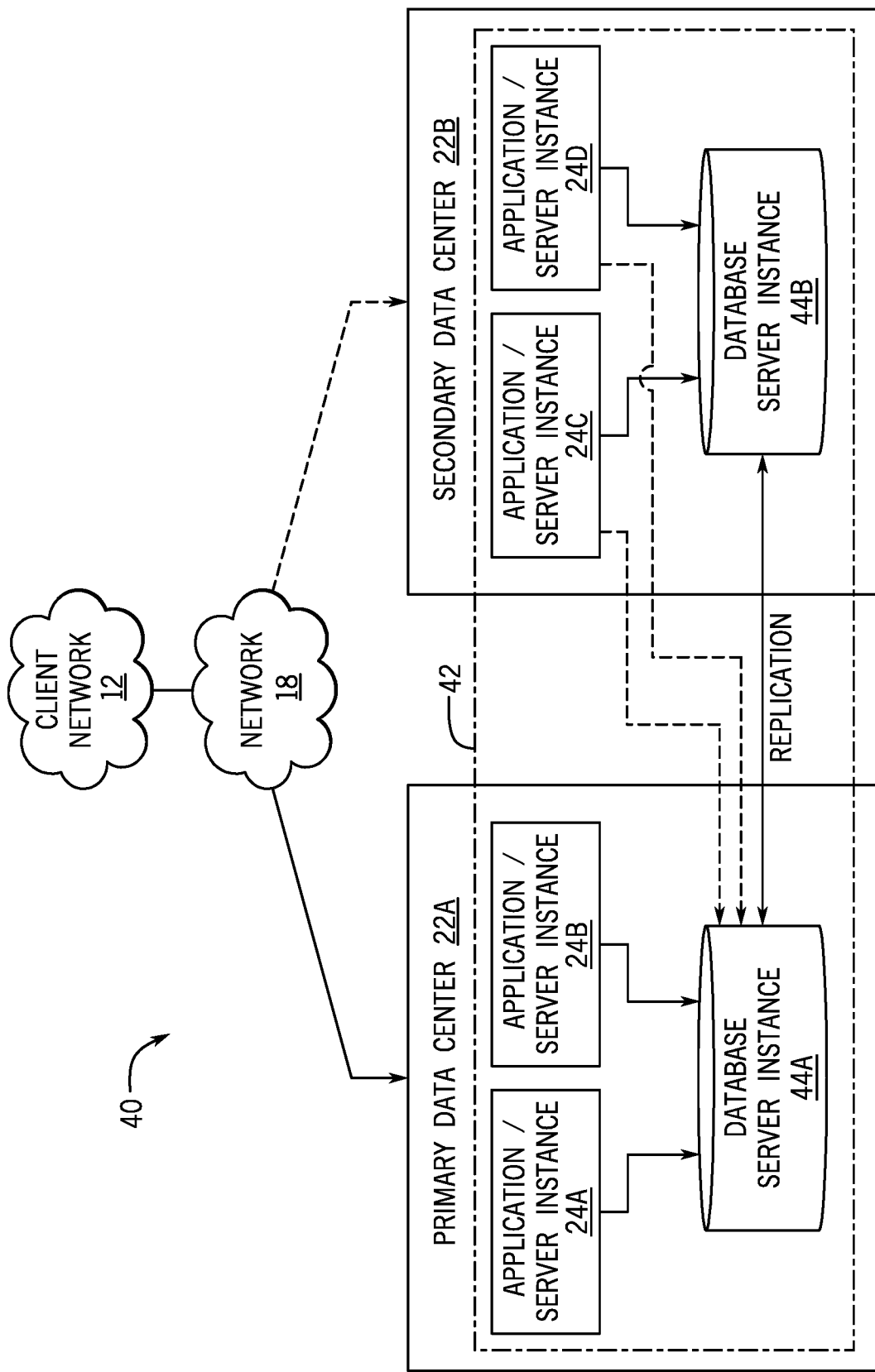
FIG. 2 is a block diagram of an embodiment of a multi-instance cloud architecture in which embodiments of the present technique may operate.

FIG. 2 is a schematic diagram of an embodiment of a multi-instance cloud architecture 40 where embodiments of the present disclosure may operate. FIG. 2 illustrates that the multi-instance cloud architecture 40 includes the client network 12 and the network 18 that connect to two (e.g., paired) data centers 22A and 22B that may be geographically separated from one another. Using FIG. 2 as an example, network environment and service provider cloud infrastructure client instance 42 (also referred to herein as a simply client instance 42) is associated with (e.g., supported and enabled by) dedicated virtual servers (e.g., virtual servers 24A, 24B, 24C, and 24D) and dedicated database servers (e.g., virtual database servers 44A and 44B). Stated another way, the virtual servers 24A-24D and virtual database servers 44A and 44B are not shared with other client instances and are specific to the respective client instance 42. Other embodiments of the multi-instance cloud architecture 40 could include other types of dedicated virtual servers, such as a web server. For example, the client instance 42 could be associated with (e.g., supported and enabled by) the dedicated virtual servers 24A-24D, dedicated virtual database servers 44A and 44B, and additional dedicated virtual web servers (not shown in FIG. 2).

In the depicted example, to facilitate availability of the client instance 42, the virtual servers 24A-24D and virtual database servers 44A and 44B are allocated to two different data centers 22A and 22B, where one of the data centers 22 acts as a backup data center. In reference to FIG. 2, data center 22A acts as a primary data center that includes a primary pair of virtual servers 24A and 24B and the primary virtual database server 44A associated with the client instance 42. Data center 22B acts as a secondary data center 22B to back up the primary data center 22A for the client instance 42. To back up the primary data center 22A for the client instance 42, the secondary data center 22B includes a secondary pair of virtual servers 24C and 24D and a secondary virtual database server 44B. The primary virtual database server 44A is able to replicate data to the secondary virtual database server 44B (e.g., via the network 18).

As shown in FIG. 2, the primary virtual database server 44A may back up data to the secondary virtual database server 44B using a database replication operation. The replication of data between data could be implemented by performing full backups weekly and daily incremental backups in both data centers 22A and 22B. Having both a primary data center 22A and secondary data center 22B allows data traffic that typically travels to the primary data center 22A for the client instance 42 to be diverted to the second data center 22B during a failure and/or maintenance scenario. Using FIG. 2 as an example, if the virtual servers 24A and 24B and/or primary virtual database server 44A fails and/or is under maintenance, data traffic for client instances 42 can be diverted to the secondary virtual servers 24C and/or 24D and the secondary virtual database server instance 44B for processing.

Although FIGS. 1 and 2 illustrate specific embodiments of a cloud computing system 10 and a multi-instance cloud architecture 40, respectively, the disclosure is not limited to the specific embodiments illustrated in FIGS. 1 and 2. For instance, although FIG. 1 illustrates that the platform 20 is implemented using data centers, other embodiments of the platform 20 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 24A-D and virtual database servers 44A and 44B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
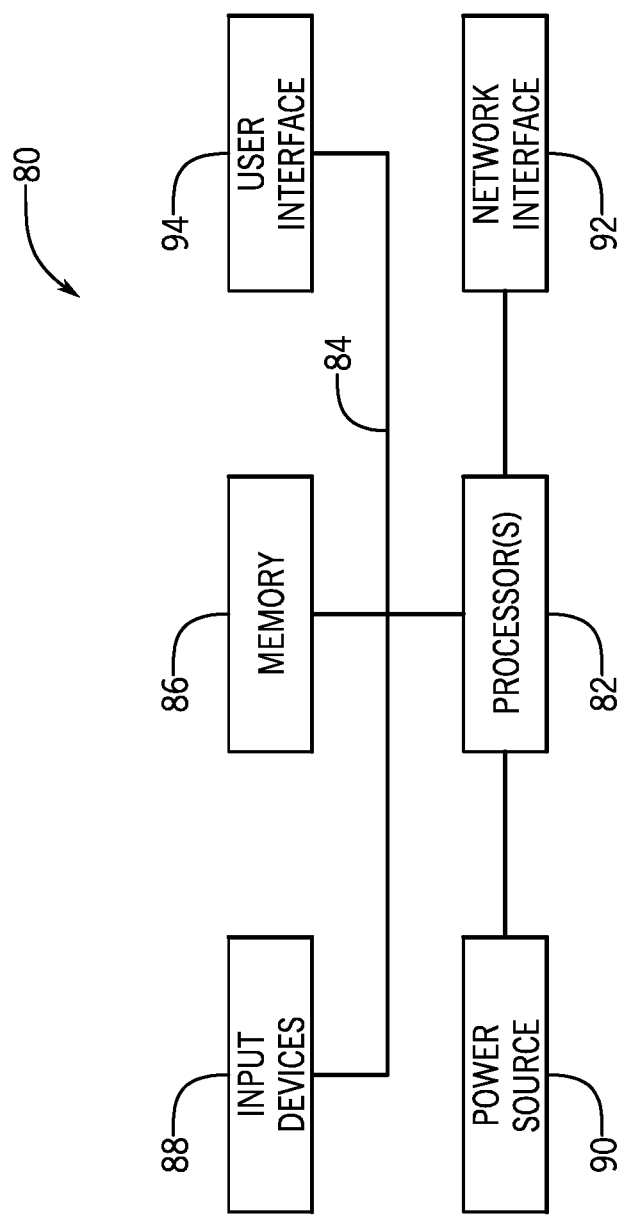
FIG. 3 is a block diagram of a computing device utilized in a computing system that may be present in FIG. 1 or 2, in accordance with aspects of the present technique.

With this in mind, and by way of background, it may be appreciated that the present approach may be implemented using one or more processor-based systems such as shown in FIG. 3. Likewise, applications and/or databases utilized in the present approach stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 80 and their potential interconnections or communication paths, such as along one or more busses. As illustrated, the computing system 80 may include various hardware components such as, but not limited to, one or more processors 82, one or more busses 84, memory 86, input devices 88, a power source 90, a network interface 92, a user interface 94, and/or other computer components useful in performing the functions described herein.

The one or more processors 82 may include one or more microprocessors capable of performing instructions stored in the memory 86. Additionally or alternatively, the one or more processors 82 may include application-specific integrated circuits (ASICs), field-programmable gate arrays (FPGAs), and/or other devices designed to perform some or all of the functions discussed herein without calling instructions from the memory 86.

With respect to other components, the one or more busses 84 include suitable electrical channels to provide data and/or power between the various components of the computing system 80. The memory 86 may include any tangible, non-transitory, and computer-readable storage media. Although shown as a single block in FIG. 1, the memory 86 can be implemented using multiple physical units of the same or different types in one or more physical locations. The input devices 88 correspond to structures to input data and/or commands to the one or more processor 82. For example, the input devices 88 may include a mouse, touchpad, touchscreen, keyboard and the like. The power source 90 can be any suitable source for power of the various components of the computing device 80, such as line power and/or a battery source. The network interface 92 includes one or more transceivers capable of communicating with other devices over one or more networks (e.g., a communication channel). The network interface 92 may provide a wired network interface or a wireless network interface. A user interface 94 may include a display that is configured to display text or images transferred to it from the one or more processors 82. In addition and/or alternative to the display, the user interface 94 may include other devices for interfacing with a user, such as lights (e.g., LEDs), speakers, and the like.

It should be appreciated that the cloud-based platform 20 discussed above provides an example an architecture that may utilize NLU technologies. In particular, the cloud-based platform 20 may include or store a large corpus of source data that can be mined, to facilitate the generation of a number of outputs, including an intent/entity model. For example, the cloud-based platform 20 may include ticketing source data having requests for changes or repairs to particular systems, dialog between the requester and a service technician or an administrator attempting to address an issue, a description of how the ticket was eventually resolved, and so forth. Then, the generated intent/entity model can serve as a basis for classifying intents in future requests, and can be used to generate and improve a conversational model to support a virtual agent that can automatically address future issues within the cloud-based platform 20 based on natural language requests from users. As such, in certain embodiments described herein, the disclosed agent automation framework is incorporated into the cloud-based platform 20, while in other embodiments, the agent automation framework may be hosted and executed (separately from the cloud-based platform 20) by a suitable system that is communicatively coupled to the cloud-based platform 20 to process utterances, as discussed below.

Figure 4A:
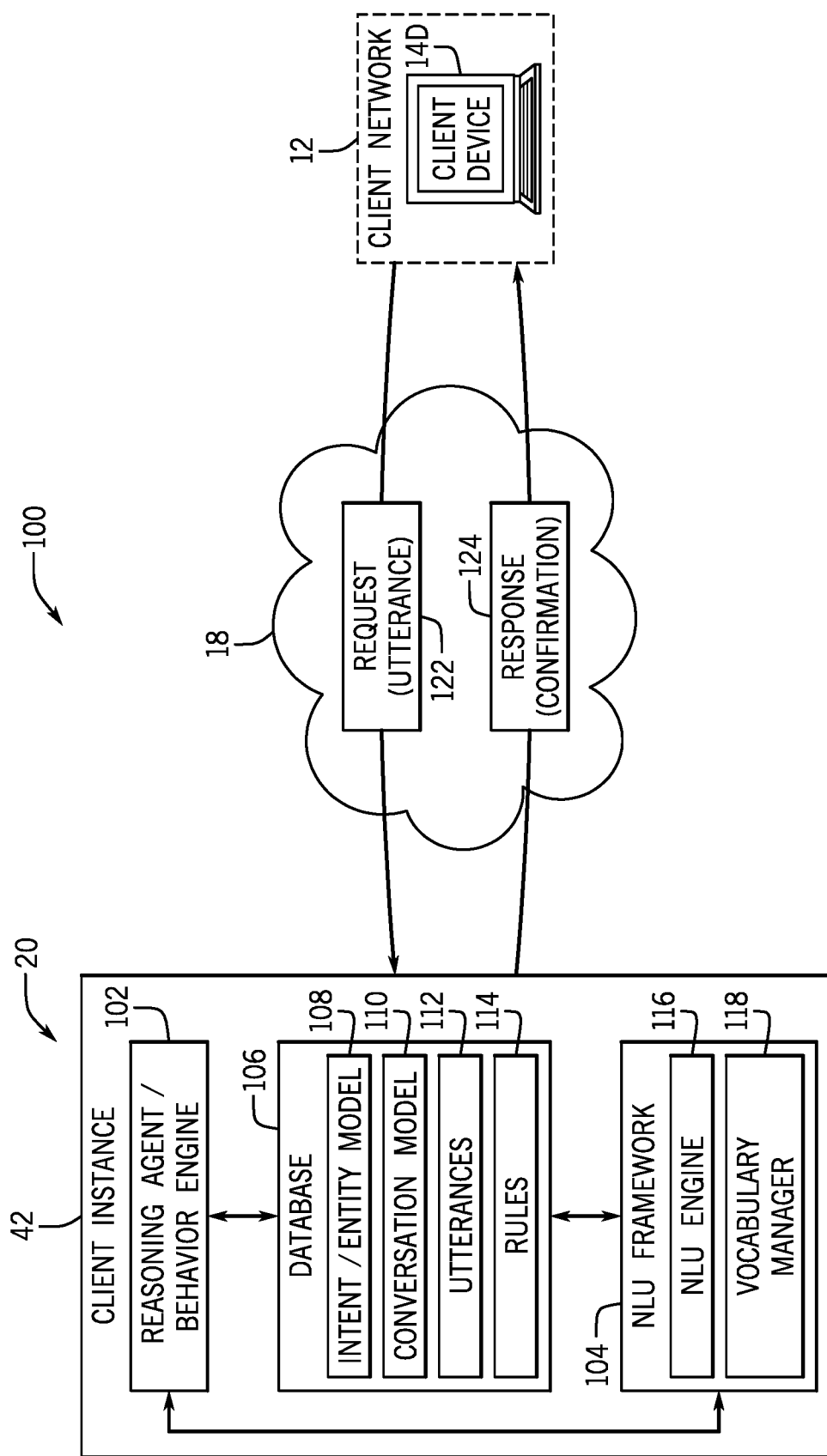
FIG. 4A is a schematic diagram illustrating an embodiment of an agent automation framework including a NLU framework that is part of a client instance hosted by the cloud computing system, in accordance with aspects of the present technique.

With the foregoing in mind, FIG. 4A illustrates an agent automation framework 100 (also referred to herein as an agent automation system 100) associated with a client instance 42, in accordance with embodiments of the present technique. More specifically, FIG. 4A illustrates an example of a portion of a service provider cloud infrastructure, including the cloud-based platform 20 discussed above. The cloud-based platform 20 is connected to a client device 14D via the network 18 to provide a user interface to network applications executing within the client instance 42 (e.g., via a web browser of the client device 14D). Client instance 42 is supported by virtual servers similar to those explained with respect to FIG. 2, and is illustrated here to show support for the disclosed functionality described herein within the client instance 42. The cloud provider infrastructure is generally configured to support a plurality of end-user devices, such as client device 14D, concurrently, wherein each end-user device is in communication with the single client instance 42. Also, the cloud provider infrastructure may be configured to support any number of client instances, such as client instance 42, concurrently, with each of the instances in communication with one or more end-user devices. As mentioned above, an end-user may also interface with client instance 42 using an application that is executed within a web browser.

The embodiment of the agent automation framework 100 illustrated in FIG. 4A includes a reasoning agent/behavior engine (RA/BE) 102, a NLU framework 104, and a database 106, which are communicatively coupled within the client instance 42. The RA/BE 102 may host or include any suitable number of virtual agents or personas that interact with the user of the client device 14D via natural language user requests 122 (also referred to herein as user utterances 122) and agent responses 124 (also referred to herein as agent utterances 124). It may be noted that, in actual implementations, the agent automation framework 100 may include a number of other suitable components, including the meaning extraction subsystem, the meaning search subsystem, and so forth, in accordance with the present disclosure.

For the embodiment illustrated in FIG. 4A, the database 106 may be a database server instance (e.g., database server instance 44A or 44B, as discussed with respect to FIG. 2), or a collection of database server instances. The illustrated database 106 stores an intent/entity model 108, a conversation model 110, a corpus of utterances 112, and a collection of rules 114 in one or more tables (e.g., relational database tables) of the database 106. The intent/entity model 108 stores associations or relationships between particular intents and particular sample utterances. In certain embodiments, the intent/entity model 108 may be authored by a designer using a suitable authoring tool. However, it should be noted that such intent/entity models typically include a limited number of sample utterances provided by the designer. Additionally, designers may have limited linguistic knowledge and, furthermore, are constrained from reasonably providing a comprehensive list of all possible ways of specifying intents in a domain. It is also presently recognized that, since the meaning associated with various intents and entities is continuously evolving within different contexts (e.g., different language evolutions per domain, per cultural setting, per client, and so forth), authored intent/entity models generally are manually updated over time. As such, it is recognized that authored intent/entity models are limited by the time and ability of the designer, and as such, these human-generated intent/entity models can be limited in both scope and functionality.

With this in mind, in certain embodiments, the intent/entity model 108 may instead be generated from the corpus of utterances 112 using techniques described in the commonly assigned, co-pending U.S. patent application Ser. No. 16/179,681, entitled, "METHOD AND SYSTEM FOR AUTOMATED INTENT MINING, CLASSIFICATION AND DISPOSITION," filed Nov. 2, 2018, which is incorporated by reference herein in its entirety for all purposes. More specifically, the intent/entity model 108 may be generated based on the corpus of utterances 112 and the collection of rules 114 stored in one or more tables of the database 106. It may be appreciated that the corpus of utterances 112 may include source data collected with respect to a particular context, such as chat logs between users and a help desk technician within a particular enterprise, from a particular group of users, communications collected from a particular window of time, and so forth. As such, the corpus of utterances 112 enable the agent automation framework 100 to build an understanding of intents and entities that appropriately correspond with the terminology and diction that may be particular to certain contexts and/or technical fields, as discussed in greater detail below.

For the embodiment illustrated in FIG. 4A, the conversation model 110 stores associations between intents of the intent/entity model 108 and particular responses and/or actions, which generally define the behavior of the RA/BE 102. In certain embodiments, at least a portion of the associations within the conversation model are manually created or predefined by a designer of the RA/BE 102 based on how the designer wants the RA/BE 102 to respond to particular identified intents/entities in processed utterances. It should be noted that, in different embodiments, the database 106 may include other database tables storing other information related to intent classification, such as a tables storing information regarding compilation model template data (e.g., class compatibility rules, class-level scoring coefficients, tree-model comparison algorithms, tree substructure vectorization algorithms), meaning representations, and so forth, in accordance with the present disclosure.

For the illustrated embodiment, the NLU framework 104 includes a NLU engine 116 and a vocabulary manager 118 (also referred to herein as a vocabulary subsystem). It may be appreciated that the NLU framework 104 may include any suitable number of other components. In certain embodiments, the NLU engine 116 is designed to perform a number of functions of the NLU framework 104, including generating word vectors (e.g., intent vectors, subject or entity vectors, subtree vectors) from word or phrases of utterances, as well as determining distances (e.g., Euclidean distances) between these vectors. For example, the NLU engine 116 is generally capable of producing a respective intent vector for each intent of an analyzed utterance. As such, a similarity measure or distance between two different utterances can be calculated using the respective intent vectors produced by the NLU engine 116 for the two intents, wherein the similarity measure provides an indication of similarity in meaning between the two intents.

The vocabulary manager 118, which may be part of the vocabulary subsystem discussed below, addresses out-of-vocabulary words and symbols that were not encountered by the NLU framework 104 during vocabulary training. For example, in certain embodiments, the vocabulary manager 118 can identify and replace synonyms and domain-specific meanings of words and acronyms within utterances analyzed by the agent automation framework 100 (e.g., based on the collection of rules 114), which can improve the performance of the NLU framework 104 to properly identify intents and entities within context-specific utterances. Additionally, to accommodate the tendency of natural language to adopt new usages for pre-existing words, in certain embodiments, the vocabulary manager 118 handles repurposing of words previously associated with other intents or entities based on a change in context. For example, the vocabulary manager 118 could handle a situation in which, in the context of utterances from a particular client instance and/or conversation channel, the word "bike" actually refers to a motorcycle rather than a bicycle.

Once the intent/entity model 108 and the conversation model 110 have been created, the agent automation framework 100 is designed to receive a user utterance 122 (in the form of a natural language request) and to appropriately take action to address request. For example, for the embodiment illustrated in FIG. 4A, the RA/BE 102 is a virtual agent that receives, via the network 18, the utterance 122 (e.g., a natural language request in a chat communication) submitted by the client device 14D disposed on the client network 12. The RA/BE 102 provides the utterance 122 to the NLU framework 104, and the NLU engine 116, along with the various subsystems of the NLU framework discussed below, processes the utterance 122 based on the intent/entity model 108 to derive intents/entities within the utterance. Based on the intents/entities derived by the NLU engine 116, as well as the associations within the conversation model 110, the RA/BE 102 performs one or more particular predefined actions. For the illustrated embodiment, the RA/BE 102 also provides a response 124 (e.g., a virtual agent utterance or confirmation) to the client device 14D via the network 18, for example, indicating actions performed by the RA/BE 102 in response to the received user utterance 122. Additionally, in certain embodiments, the utterance 122 may be added to the utterances 112 stored in the database 106 for continued learning within the NLU framework 104.

It may be appreciated that, in other embodiments, one or more components of the agent automation framework 100 and/or the NLU framework 104 may be otherwise arranged, situated, or hosted for improved performance. For example, in certain embodiments, one or more portions of the NLU framework 104 may be hosted by an instance (e.g., a shared instance, an enterprise instance) that is separate from, and communicatively coupled to, the client instance 42. It is presently recognized that such embodiments can advantageously reduce the size of the client instance 42, improving the efficiency of the cloud-based platform 20. In particular, in certain embodiments, one or more components of the semantic mining framework 130 discussed below may be hosted by a separate instance (e.g., an enterprise instance) that is communicatively coupled to the client instance 42, as well as other client instances, to enable semantic intent mining and generation of the intent/entity model 108.

Figure 4B:
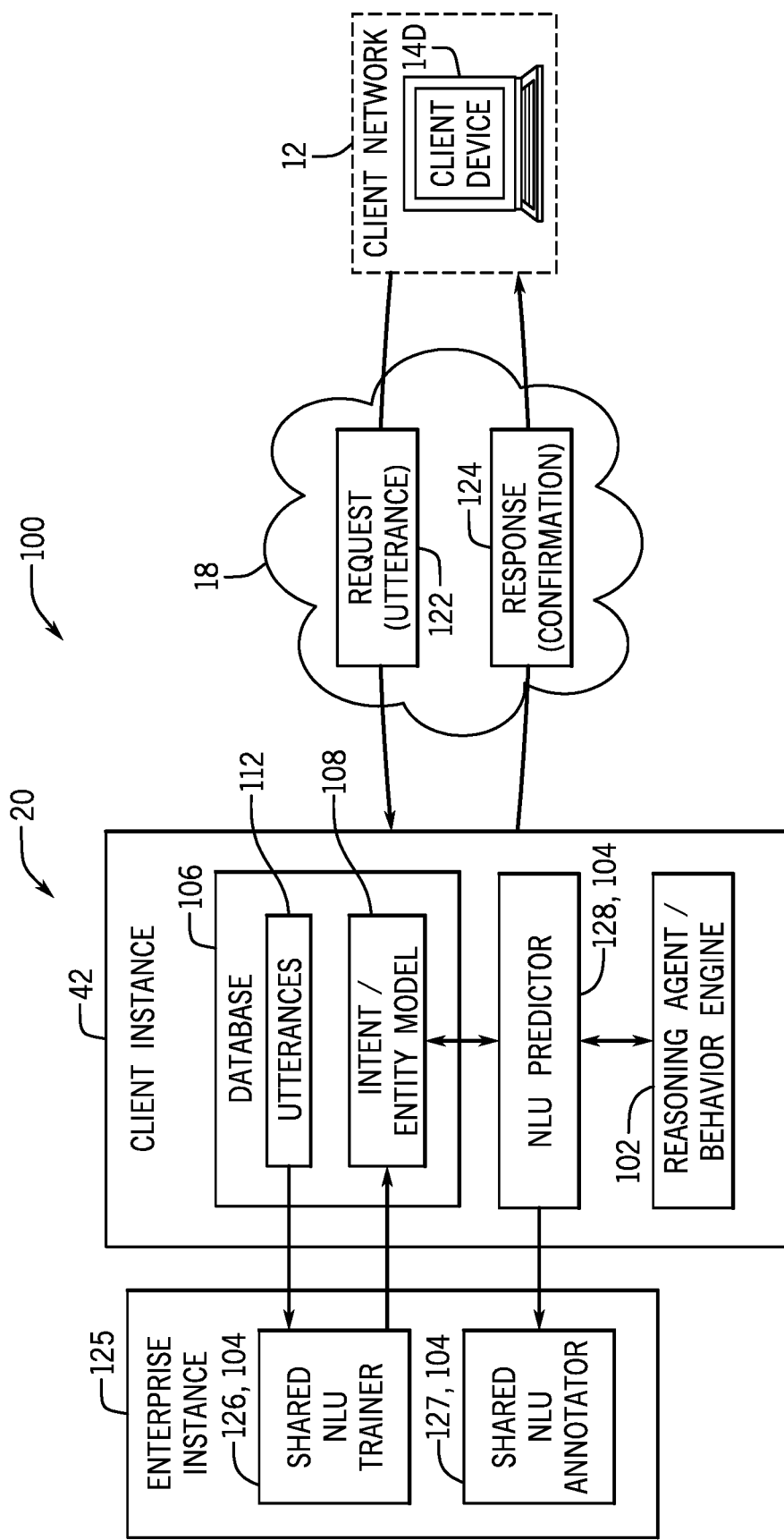
FIG. 4B is a schematic diagram illustrating an alternative embodiment of the agent automation framework in which portions of the NLU framework are part of an enterprise instance hosted by the cloud computing system, in accordance with aspects of the present technique.

With the foregoing in mind, FIG. 4B illustrates an alternative embodiment of the agent automation framework 100 in which portions of the NLU framework 104 are instead executed by a separate, shared instance (e.g., enterprise instance 125) that is hosted by the cloud computing system 20. The illustrated enterprise instance 125 is communicatively coupled to exchange data related to intent/entity mining and classification with any suitable number of client instances via a suitable protocol (e.g., via suitable Representational State Transfer (REST) requests/responses). As such, for the design illustrated in FIG. 4B, by hosting a portion of the NLU framework as a shared resource accessible to multiple client instances 42, the size of the client instance 42 can be substantially reduced (e.g., compared to the embodiment of the agent automation framework 100 illustrated in FIG. 4A) and the overall efficiency of the agent automation framework 100 can be improved.

In particular, the NLU framework 104 illustrated in FIG. 4B is divided into three distinct components that perform different aspects of semantic mining and intent classification within the NLU framework 104. These components include: a shared NLU trainer 126 hosted by the enterprise instance 125, a shared NLU annotator 127 hosted by the enterprise instance 125, and a NLU predictor 128 hosted by the client instance 42. It may be appreciated that the organizations illustrated in FIGS. 4A and 4B are merely examples, and in other embodiments, other organizations of the NLU framework 104 and/or the agent automation framework 100 may be used, in accordance with the present disclosure.

For the embodiment of the agent automation framework 100 illustrated in FIG. 4B, the shared NLU trainer 126 is designed to receive the corpus of utterances 112 from the client instance 42, and to perform semantic mining (e.g., including semantic parsing, grammar engineering, and so forth) to facilitate generation of the intent/entity model 108. Once the intent/entity model 108 has been generated, when the RA/BE 102 receives the user utterance 122 provided by the client device 14D, the NLU predictor 128 passes the utterance 122 and the intent/entity model 108 to the shared NLU annotator 127 for parsing and annotation of the utterance 122. The shared NLU annotator 127 performs semantic parsing, grammar engineering, and so forth, of the utterance 122 based on the intent/entity model 108 and returns annotated utterance trees of the utterance 122 to the NLU predictor 128 of client instance 42. The NLU predictor 128 then uses these annotated structures of the utterance 122, discussed below in greater detail, to identify matching intents from the intent/entity model 108, such that the RA/BE 102 can perform one or more actions based on the identified intents. It may be appreciated that the shared NLU annotator 127 may correspond to the meaning extraction subsystem 150, and the NLU predictor may correspond to the meaning search subsystem 152, of the NLU framework 104.

Figure 5:
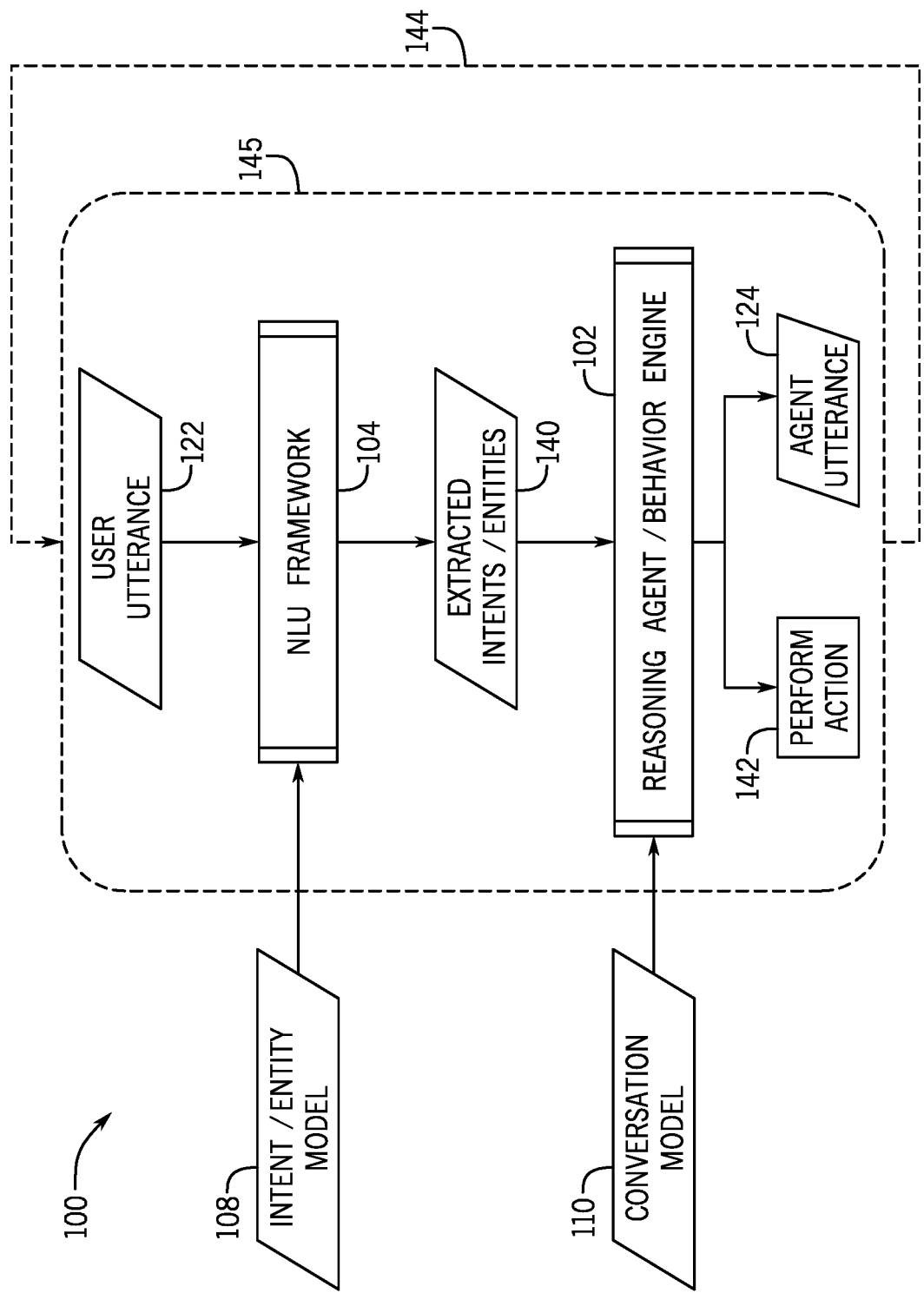
FIG. 5 is a flow diagram illustrating an embodiment of a process by which an agent automation framework, including an NLU framework and a Reasoning Agent/Behavior Engine (RA/BE) framework, extracts intent/entities from and responds to a user utterance, in accordance with aspects of the present technique.

FIG. 5 is a flow diagram depicting the roles of the reasoning agent/behavior engine (RA/BE) 102 and NLU framework 104 within an embodiment of the agent automation framework 100. It may be appreciated that, in certain embodiments, the agent automation framework 100 and/or the NLU framework 104 may include structures and/or functionality disclosed in the commonly assigned, co-pending U.S. patent application Ser. Nos. 16/238,324 and 16/238,331, both entitled, "HYBRID LEARNING SYSTEM FOR NATURAL LANGUAGE UNDERSTANDING," filed Jan. 2, 2019, which are incorporated by reference herein in their entirety for all purposes.

For the illustrated embodiment, the NLU framework 104 processes a received user utterance 122 to extract intents/entities 140 based on the intent/entity model 108. The extracted intents/entities 140 may be implemented as a collection of symbols that represent intents and entities of the user utterance 122 in a form that is consumable by the RA/BE 102. As such, these extracted intents/entities 140 are provided to the RA/BE 102, which processes the received intents/entities 140 based on the conversation model 110 to determine suitable actions 142 (e.g., changing a password, creating a record, purchasing an item, closing an account) and/or virtual agent utterances 124 in response to the received user utterance 122. As indicated by the arrow 144, the process 145 can continuously repeat as the agent automation framework 100 receives and addresses additional user utterances 122 from the same user and/or other users in a conversational format.

As illustrated in FIG. 5, it may be appreciated that, in certain situations, no further action or communications may occur once the suitable actions 142 have been performed. Additionally, it should be noted that, while the user utterance 122 and the agent utterance 124 are discussed herein as being conveyed using a written conversational medium or channel (e.g., chat, email, ticketing system, text messages, forum posts), in other embodiments, voice-to-text and/or text-to-voice modules or plugins could be included to translate spoken user utterance 122 into text and/or translate text-based agent utterance 124 into speech to enable a voice interactive system, in accordance with the present disclosure. Furthermore, in certain embodiments, both the user utterance 122 and the virtual agent utterance 124 may be stored in the database 106 (e.g., in the corpus of utterances 112) to enable continued learning of new structure and vocabulary within the agent automation framework 100.

Figure 6:
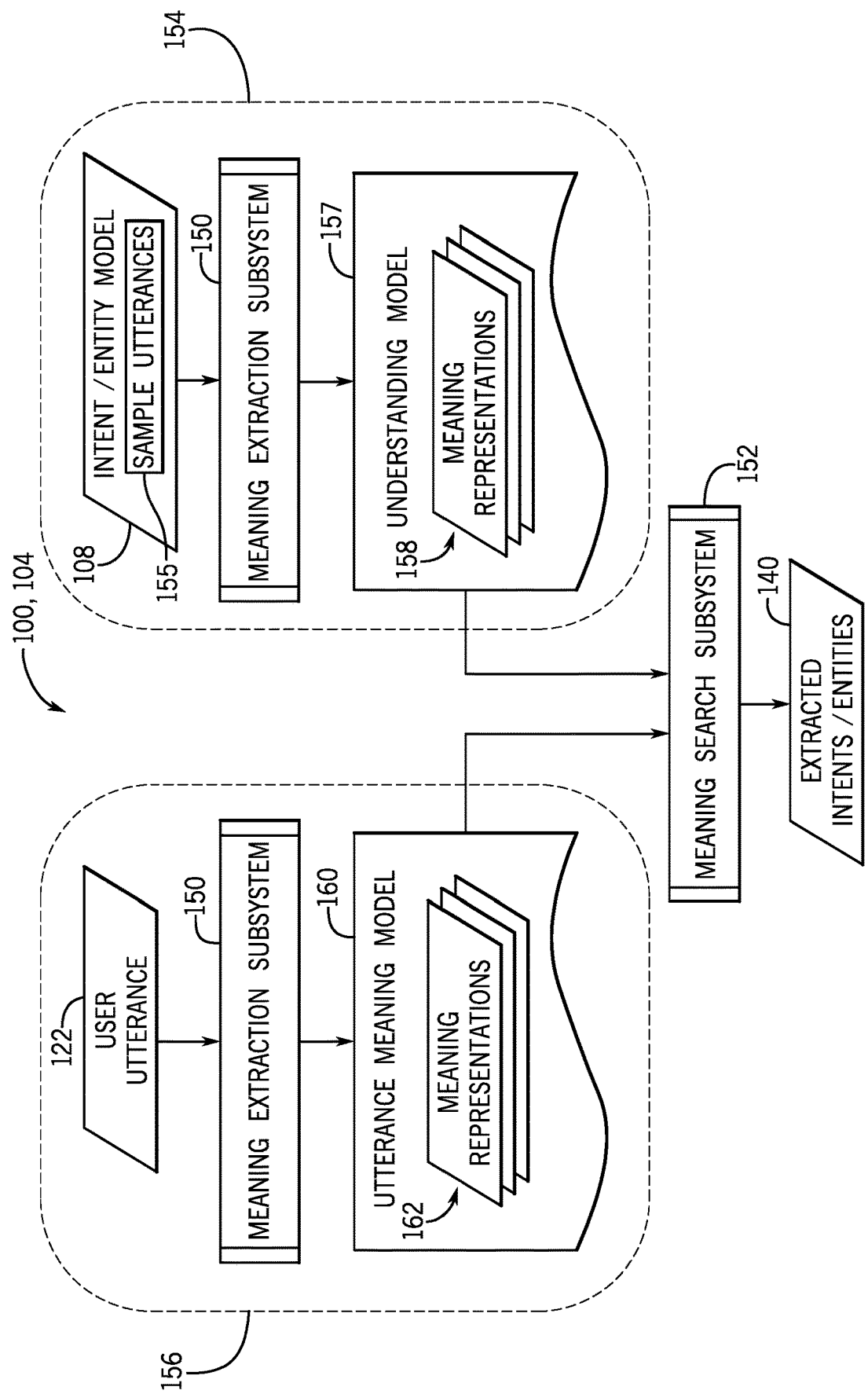
FIG. 6 is a block diagram illustrating an embodiment of the NLU framework including a meaning extraction subsystem and a meaning search subsystem, wherein the meaning extraction subsystem generates meaning representations from a received user utterance to yield an utterance meaning model and generates meaning representations from sample utterances of an intent/entity model to yield understanding model, and wherein the meaning search subsystem compares meaning representations of the utterance meaning model to meaning representations of the understanding model to extract intents and entities from the received user utterance, in accordance with aspects of the present technique.

As mentioned, the NLU framework 104 includes two primary subsystems that cooperate to convert the hard problem of NLU into a manageable search problem—namely: a meaning extraction subsystem and a meaning search subsystem. For example, FIG. 6 is a block diagram illustrating roles of the meaning extraction subsystem 150 and the meaning search subsystem 152 of the NLU framework 104 within an embodiment of the agent automation framework 100. For the illustrated embodiment, the right-hand portion 154 of FIG. 6 illustrates the meaning extraction subsystem 150 of the NLU framework 104 receiving the intent/entity model 108, which includes sample utterances 155 for each of the various intents/entities of the model. The meaning extraction subsystem 150 generates an understanding model 157 that includes meaning representations 158 of the sample utterances 155 of the intent/entity model 108. In other words, the understanding model 157 is a translated or augmented version of the intent/entity model 108 that includes meaning representations 158 to enable searching (e.g., comparison and matching) by the meaning search subsystem 152, as discussed below. As such, it may be appreciated that the right-hand portion 154 of FIG. 6 is generally performed in advance of receiving the user utterance 122, such as on a routine, scheduled basis or in response to updates to the intent/entity model 108.

For the embodiment illustrated in FIG. 6, the left-hand portion 156 illustrates the meaning extraction subsystem 150 also receiving and processing the user utterance 122 to generate an utterance meaning model 160 having at least one meaning representation 162. As discussed in greater detail below, these meaning representations 158 and 162 are data structures having a form that captures the grammatical, syntactic structure of an utterance, wherein subtrees of the data structures include subtree vectors that encode the semantic meanings of portions of the utterance. As such, for a given utterance, a corresponding meaning representation captures both syntactic and semantic meaning in a common meaning representation format that enables searching, comparison, and matching by the meaning search subsystem 152. Accordingly, the meaning representations 162 of the utterance meaning model 160 can be generally thought of like a search key, while the meaning representations of the understanding model 157 define a search space in which the search key can be sought. Accordingly, the meaning search subsystem 152 searches the meaning representations 158 of the understanding model 157 to locate one or more intents/entities that match the meaning representation 162 of the utterance meaning model 160, thereby generating the extracted intents/entities 140.

Figure 7:
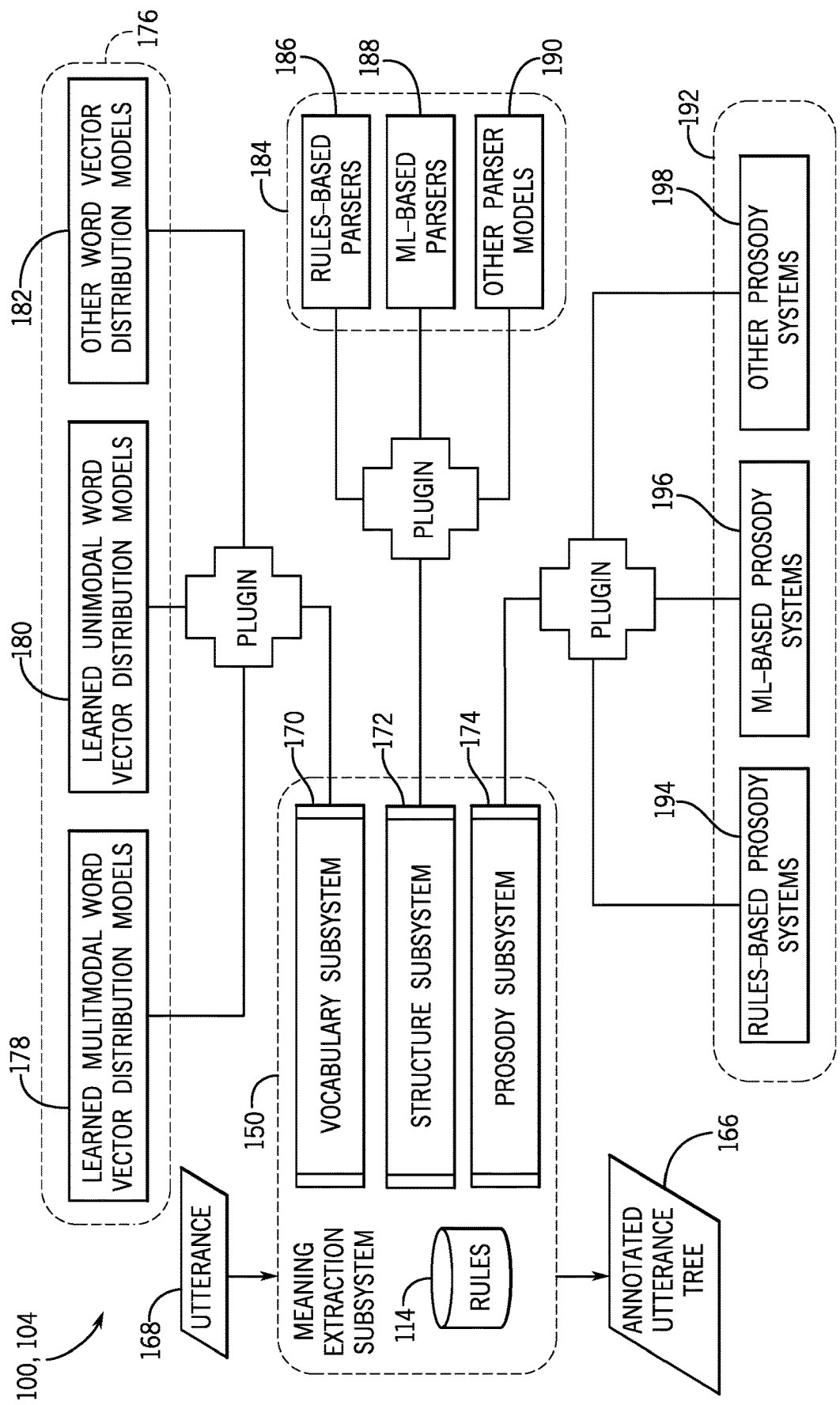
FIG. 7 is a block diagram illustrating an embodiment of the meaning extraction subsystem using a combination of rules-based methods and machine-learning(ML)-based methods within a vocabulary subsystem, a structure subsystem, and a prosody subsystem, to generate an annotated utterance tree for an utterance, in accordance with aspects of the present technique.

The meaning extraction subsystem of FIG. 6 itself includes a number of subsystems that cooperate to generate the meaning representations 158 and 162. For example, FIG. 7 is a block diagram illustrating an embodiment of the meaning extraction subsystem 150 of the NLU framework 104 of the agent automation framework 100. The illustrated embodiment of the meaning extraction subsystem 150 uses a rules-based methods interleaved with ML-based methods to generate an annotated utterance tree 166 for an utterance 168, which may be either a user utterance 122 or one of the sample utterances 155 of the intent/entity model 108, as discussed above with respect to FIG. 6. More specifically, FIG. 7 illustrates how embodiments of the meaning extraction subsystem 150 can include a number of best-of-breed models, including combinations of rule-based and ML-based (e.g., statistical) models and programs, that can be plugged into the overall NLU framework 104. For example, because of the pluggable design of the illustrated meaning extraction subsystem 150, the vocabulary subsystem 170 can include any suitable word vector distribution model that defines word vectors for various words or phrases. That is, since it is recognized that different word distribution models can excel over others in a given conversational channel, language, context, and so forth, the disclosed pluggable design enables the meaning extraction subsystem 150 to be customized to particular environments and applications. For the embodiment illustrated in FIG. 7, the meaning extraction subsystem 150 includes three plugin-supported subsystems, namely a vocabulary subsystem 170, a structure subsystem 172, and a prosody subsystem 174, and the various outputs of these subsystems are combined according to the stored rules 114 to generate the annotated utterance tree 166 from the utterance 168.

For the embodiment of the meaning extraction subsystem 150 illustrated in FIG. 7, the vocabulary subsystem 170 generally handles the vocabulary of the meaning extraction subsystem 150. As such, the illustrated meaning extraction subsystem 150 includes a number of vocabulary plug-ins 176 that enable analysis and extraction of the vocabulary of utterances. For the illustrated embodiment, the vocabulary plug-ins 176 include a learned multimodal word vector distribution model 178, a learned unimodal word vector distribution model 180, and any other suitable word vector distribution models 182. In this context, "unimodal" refers to word vector distribution models having a single respective vector for each word, while "multimodal" refers to word vector distribution models supporting multiple vectors for particular words (e.g., homonyms, polysemes) that can have different meanings in different contexts (e.g., a "bank" may refer to a place to store money, money itself, a maneuver of an aircraft, or a location near a river). The models 178, 180, and 182 provide pluggable collections of word vectors that can be selected based on suitable parameters, such as language, conversation style, conversational channel, and so forth.

For example, the learned multimodal distribution model 178 and the learned unimodal distribution model 180 can provide word distributions (e.g., defined vector spaces of word vectors) that are generated using unsupervised learning or other general clustering algorithms. That is, appreciating that words commonly used in close proximity within utterances often have related meanings, the learned multimodal distribution model 178 and learned unimodal distribution model 180 can be generated by performing statistical analysis of utterances (e.g., from the corpus of utterances 112), and then defining vectors for words based on how the word is commonly used with respect to other words within these utterances. As such, these vocabulary plugins 176 enable the vocabulary subsystem 170 to recognize and address synonyms, misspelled words, encoded symbols (e.g., web addresses, network paths, emoticons, and emojis), out-of-vocabulary terms, and so forth, when processing the user utterance 122 and sample utterances 155. In certain embodiments, the vocabulary subsystem 170 can combine or select from word vectors output by the various vocabulary plug-ins 176 based on the stored rules 114 to generate word vectors for nodes of the annotated utterance tree 166, as discussed below. Moreover, the word vector distribution models 178, 180, and/or 182 can be continually updated based on unsupervised learning performed on received user utterances 122.

For the embodiment illustrated in FIG. 7, the structure subsystem 172 of the meaning extraction subsystem 150 analyzes a linguistic shape of the utterance 168 using a combination of rule-based and ML-based structure parsing plugins 184. In other words, the illustrated structure plug-ins 184 enable analysis and extraction of the syntactic and grammatical structure of the utterances 122 and 155. For the illustrated embodiment, the structure plug-ins 184 include rule-based parsers 186, ML-based parsers 188 (e.g., DNN-based parsers, RNN-based parsers, and so forth), and other suitable parser models 190. For example, one or more of these structure plug-ins 184 enables class annotations or tagging (e.g., as a verb, a subject or entity, a direct object, a modifier, and so forth) for each word or phrase of the utterance. In certain embodiments, the structure subsystem 172 can combine or select from parse structures output by the various structure plug-ins 184 based on one or more rules 114 stored in the database 106, which are used to define the structure or shape of the annotated utterance trees 166, as discussed below.

For the embodiment illustrated in FIG. 7, the prosody subsystem 174 of the meaning extraction subsystem 150 analyzes the prosody of the utterance 168 using a combination of rule-based and ML-based prosody plugins 196. The illustrated prosody plug-ins 192 include rule-based prosody systems 194, ML-based prosody systems 196, and other suitable prosody systems 198. Using these plugins, the prosody subsystem 174 analyzes the utterance 168 for prosody cues, such as rhythm (e.g., speech rhythm, segmentations indicated by punctuation or pauses), emphasis (e.g., capitalization, bolding, underlining, asterisks), focus or attention (e.g., repetition of particular terms or styles), and so forth, which can be used to determine, for example, boundaries between intents, degrees of urgency or relative importance with respect to different intents, and so forth. As such, in certain embodiments, the prosody subsystem 174 can combine or select from prosody parsed structures output by the various prosody plug-ins 192 based on the rules 114 stored in the database 106 to generate the annotated utterance tree 166, as discussed below.

As such, for the embodiment of the meaning extraction subsystem 150 illustrated in FIG. 7, the vocabulary subsystem 170, the structure subsystem 172, and the prosody subsystem 174 cooperate to generate the annotated utterance tree 166 from the utterance 168 based on one or more rules 114. It may be appreciated that, in certain embodiments, a portion of the output of one subsystem (e.g., the prosody subsystem 174) may be provided as input to another subsystem (e.g., the structure subsystem 172) when generating the annotated utterance tree 166 from the utterance 168. The resulting annotated utterance tree 166 data structure generated by the meaning extraction subsystem 150 includes a number of nodes, each associated with a respective word vector provided by the vocabulary subsystem 170. Furthermore, these nodes are arranged and coupled together to form a tree structure based on the output of the structure subsystem 172 and the prosody subsystem 174, according to the stored rules 114.

Figure 8:
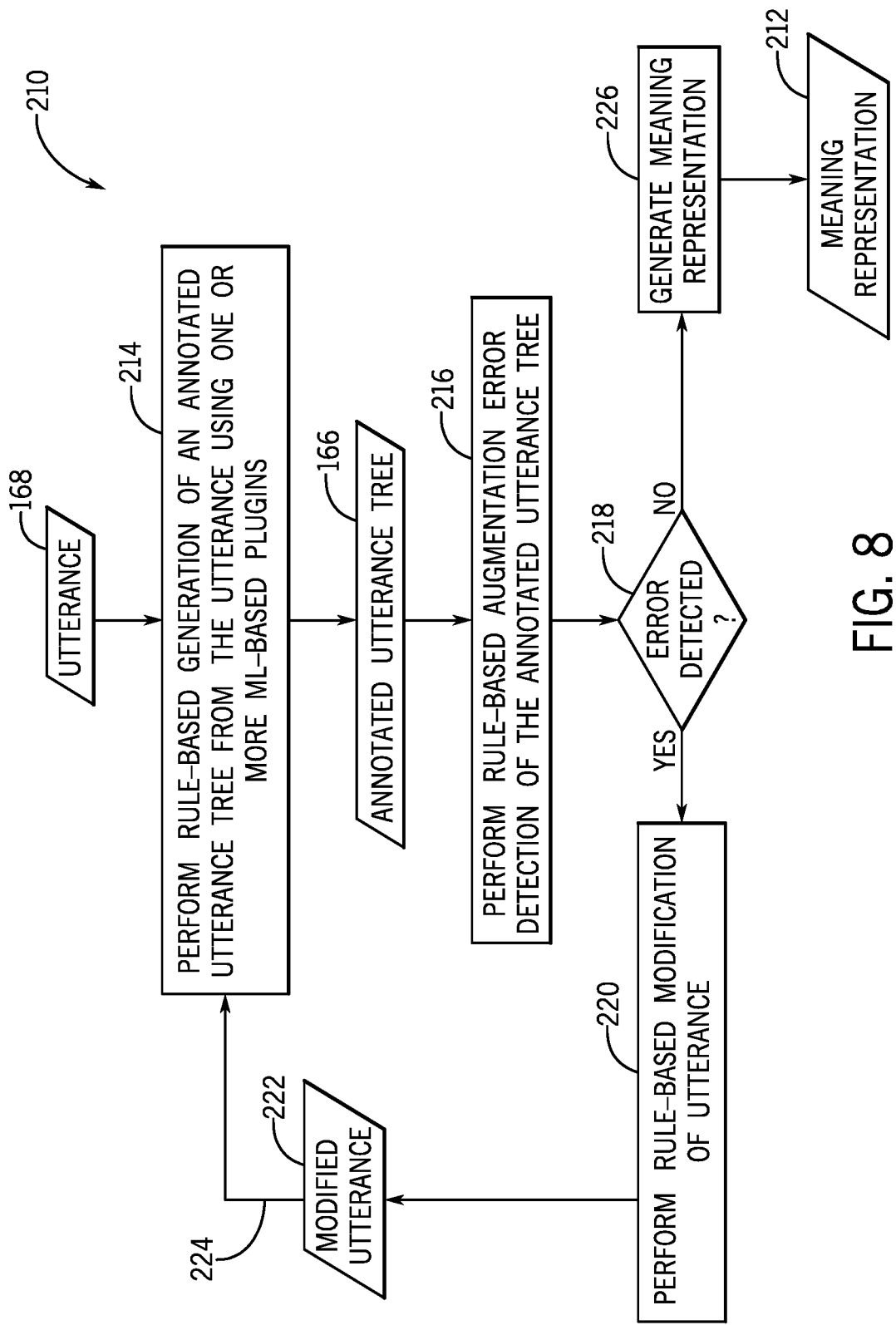
FIG. 8 is a flow diagram illustrating an example process by which the meaning extraction subsystem performs error correction of an annotated utterance tree of an utterance before generating the corresponding meaning representation of the utterance, in accordance with aspects of the present technique.

It may also be noted that, in certain embodiments, the meaning extraction subsystem 150 includes rule-based error detection and correction mechanisms for improved domain specificity. For example, FIG. 8 is a flow diagram illustrating an embodiment of a process 210 whereby the meaning extraction subsystem 150 can iteratively generate and then analyze the annotated utterance tree 166 for errors before a corresponding meaning representation 212 is generated for searching. In other words, to accommodate inaccuracies and unexpected output from ML-based models of the vocabulary subsystem 170, the structure subsystem 172, and/or the prosody subsystem 174, the meaning extraction subsystem 150 is capable of performing a rule-based automated error detection process before the corresponding meaning representation 212 is generated. It may be appreciated that, when the utterance 168 is a user utterance 122, the corresponding meaning representation 212 becomes part of the meaning representations 162 of the utterance meaning model 160, and when the utterance is one of the sample utterance 155 of the intent/entity model 108, the corresponding meaning representation 212 becomes part of the meaning representations 158 of the understanding model 157, as discussed above with respect to FIG. 6.

For the embodiment illustrated in FIG. 8, the process 210 begins with the meaning extraction subsystem 150 of the NLU framework 104 generating (block 214) the annotated utterance tree 166 from the utterance 168 using one or more ML-based plugins (e.g., ML-based parsers 188 or ML-based prosody systems 196), as discussed above. In certain embodiments, this step may include a preliminary cleansing and augmentation step performed before the annotated utterance tree 166 is generated. For example, in certain embodiments, this preliminary cleansing and augmentation step may involve the vocabulary subsystem 170, the structure subsystem 172, and/or the prosody subsystem 174 modifying the utterance 168 based on the stored rules 114. By way of specific example, during this step, the utterance 168 may be processed by the vocabulary subsystem 170 to modify words of the utterance (e.g., substitute synonyms, correct misspellings, remove punctuation, address domain-specific syntax and terminology, combine words, separate compounds words and contractions) based on the rules 114. Then, the vocabulary subsystem 170, the structure subsystem 172, and the prosody subsystem 174 of the meaning extraction subsystem 150 can cooperate to generate the annotated utterance tree 166 from the utterance 168 based on the stored rules 114.

Additionally, for the embodiment illustrated in FIG. 8, the process 210 includes a rule-based augmentation error and detection step (block 216) in which the generated annotated utterance tree 166 is analyzed for errors based on the stored rules 114. These errors may include, for example, misclassification, misparses, and so forth, by one or more ML-based plugins of the meaning extraction subsystem 150. When, during the rule-based augmentation error and detection step of block 216, the meaning extraction subsystem 150 detects an error (decision block 218), then the meaning extraction subsystem 150 performs a rule-based correction (block 220) to generate a modified utterance 222 from the original or previous utterance 168 based on the stored rules 114.

In situations in which errors are detected in block 218, once the correction has been applied in block 220, the annotated utterance tree 166 is regenerated in block 214 from the modified utterance 222 based on the rules 114, as indicated by the arrow 224. In certain embodiments, this cycle may repeat any suitable number of times, until errors are no longer detected at decision block 218. At that point, the meaning extraction subsystem 150 generates (block 226) the corresponding meaning representation 212 to be processed by the meaning search subsystem 152. In certain embodiments, information regarding the corrections performed in block 220 and the resulting annotated utterance tree 166 that is converted to the meaning representation 212 may be provided as input to train one or more ML-based plugins of the meaning extraction subsystem 150 e.g., ML-based parsers 188 or ML-based prosody systems 196), such that the erroneous annotated utterance trees can be avoided when processing future utterances.

Figure 9:
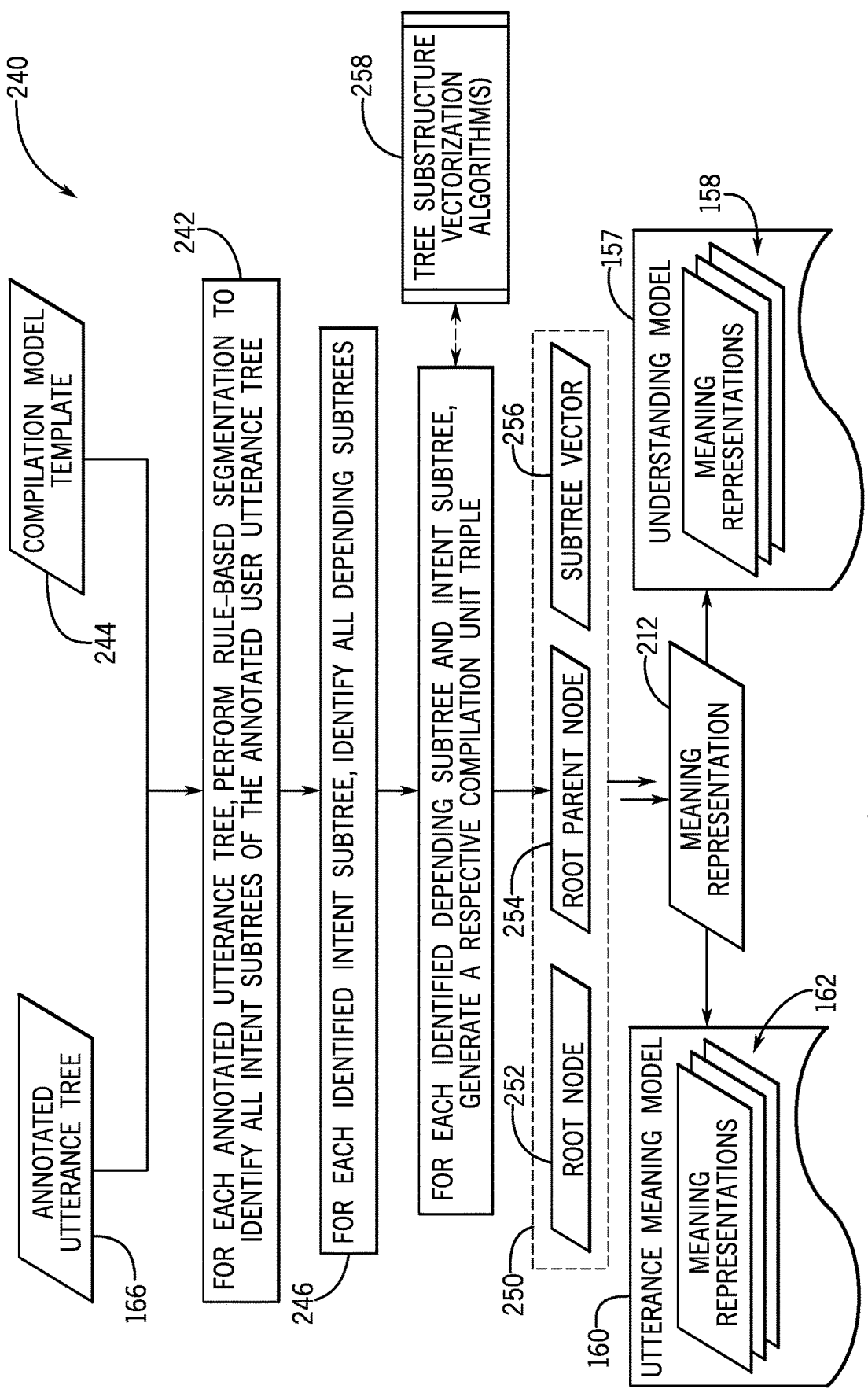
FIG. 9 is a flow diagram illustrating an example process by which the meaning extraction subsystem generates a meaning representations of the understanding model or the utterance meaning model based on the annotated utterance trees and a compilation model template, in accordance with aspects of the present technique.

In certain embodiments, generating the corresponding meaning representation 212 for the annotated utterance tree 166 (block 226) may include determining compilation unit information (e.g., root nodes, parent root nodes, and subtree vectors) and optimizing the meaning representations for search. For example, FIG. 9 is a flow diagram illustrating an embodiment of a process 240 whereby the meaning extraction subsystem 150 generates the corresponding meaning representation 212 from the annotated utterance tree 166. To do this, the prosody subsystem 174 of the meaning extraction subsystem 150 takes the annotated utterance tree 166 and performs a segmentation step (block 242) based on one or more stored rules 114 (e.g., intent segmentation rules). During this segmentation step, the annotated utterance tree 166 is segmented or divided into individual intent subtrees, each representing an atomic intent of the annotated utterance tree 166. This intent segmentation step may also involve information from a compilation model template 244, which may be part of a compilation model template table or database (e.g., associated with the database 106 of FIGS. 4A and 4B). The compilation model template 244 stores data indicating how meaning representations 162 and 158 are to be generated by the meaning extraction subsystem 150 and compared to one another by the meaning search subsystem 152, as is discussed below in greater detail.

For the embodiment illustrated in FIG. 9, for each intent subtree identified in block 242, the meaning extraction subsystem 150 identifies (block 246) all corresponding subtrees that depend from each particular intent subtree. Then, for each of these intent trees and corresponding subtrees, the meaning extraction subsystem 150 generates (block 248) a respective compilation unit triple 250. In particular, the illustrated compilation unit triple 250 includes: a reference 252 to a root node of a subtree, a reference 254 to a parent of the root node of the subtree, and a subtree vector 256 that is representative of the semantic meaning of the subtree. The aforementioned compilation model template 244 defines one or more tree substructure vectorization algorithms 258 that produce vectors for each of the corresponding subtrees, as discussed in greater detail below.

Once the compilation unit triples 250 have been generated for the annotated utterance tree 166, the annotated utterance tree 166 is converted into the meaning representation 212. In certain embodiments, certain information that is not relevant to the meaning search subsystem 152 (e.g., certain classes of nodes, certain annotation data) may be removed during this step to minimize the size of the meaning representation 212 for enhanced efficiency when searching. The generated meaning representation 212 subsequently becomes one of the meaning representations 162 of the utterance meaning model 160 or one of the meaning representations 158 of the understanding model 157, depending on the origin of the utterance 168 represented by the annotated utterance tree 166, as discussed above.

Figure 10:
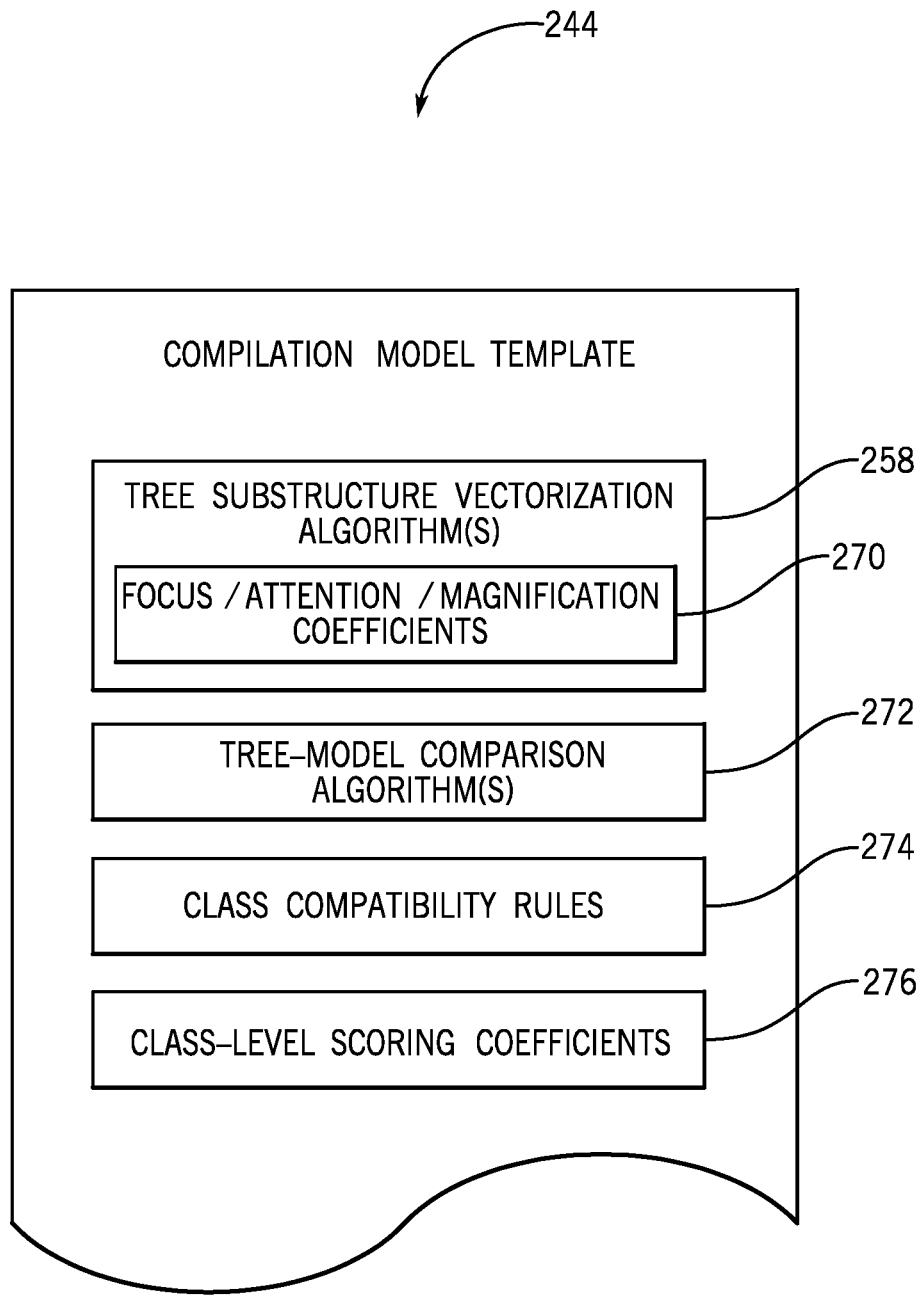
FIG. 10 is a block diagram illustrating an embodiment of the compilation model template, in accordance with aspects of the present technique.

FIG. 10 is a diagram that illustrates an example embodiment of the compilation model template 244 mentioned above. Data stored within the compilation model template 244 generally defines how the meaning extraction subsystem 150 generates subtree vectors for the annotated utterance trees 166 as part of the compilation unit triple 250 determined in block 248 of FIG. 9. Further, data stored within the compilation model template 244 generally defines how the meaning search subsystem 152 compares and scores similarity between the meaning representations 162 of the utterance meaning model 160 and the meaning representations 158 of the understanding model 157, as illustrated in FIG. 6. In certain embodiments, the compilation model template 244 may be stored as one or more tables of the database 106 illustrated in FIGS. 4A and 4B, or within another suitable data structure, in accordance with the present disclosure.

As mentioned with respect to FIG. 9, the compilation model template 244 illustrated in FIG. 10 includes one or more tables identifying or storing one or more pluggable tree substructure vectorization algorithms 258 that generate the subtree vectors 256 of the compilation unit triples 250. As illustrated, the tree substructure vectorization algorithms 258 may be associated with focus/attention/magnification (FAM) coefficients 270. For such embodiments, these FAM coefficients 270 are used to tune how much relative focus or attention (e.g., signal magnification) should be granted to each portion of a subtree when generating a subtree vector. For the meaning search performed by the meaning search subsystem 152 of FIG. 5, the illustrated embodiment of the compilation model template 244 also includes class compatibility rules 274, which define which classes of subtree vectors can be compared to one another (e.g., verb word and subtree vectors are compared to one another, subject or object word and subtree vectors are compared to one another) to determine vector distances that provide measures of meaning similarity therebetween. The illustrated embodiment of the compilation model template 244 also includes class-level scoring coefficients 276 that define different relative weights in which different classes of word/subtree vectors contribute to an overall similarity score between two subtrees during the meaning search operation.

Figure 11:
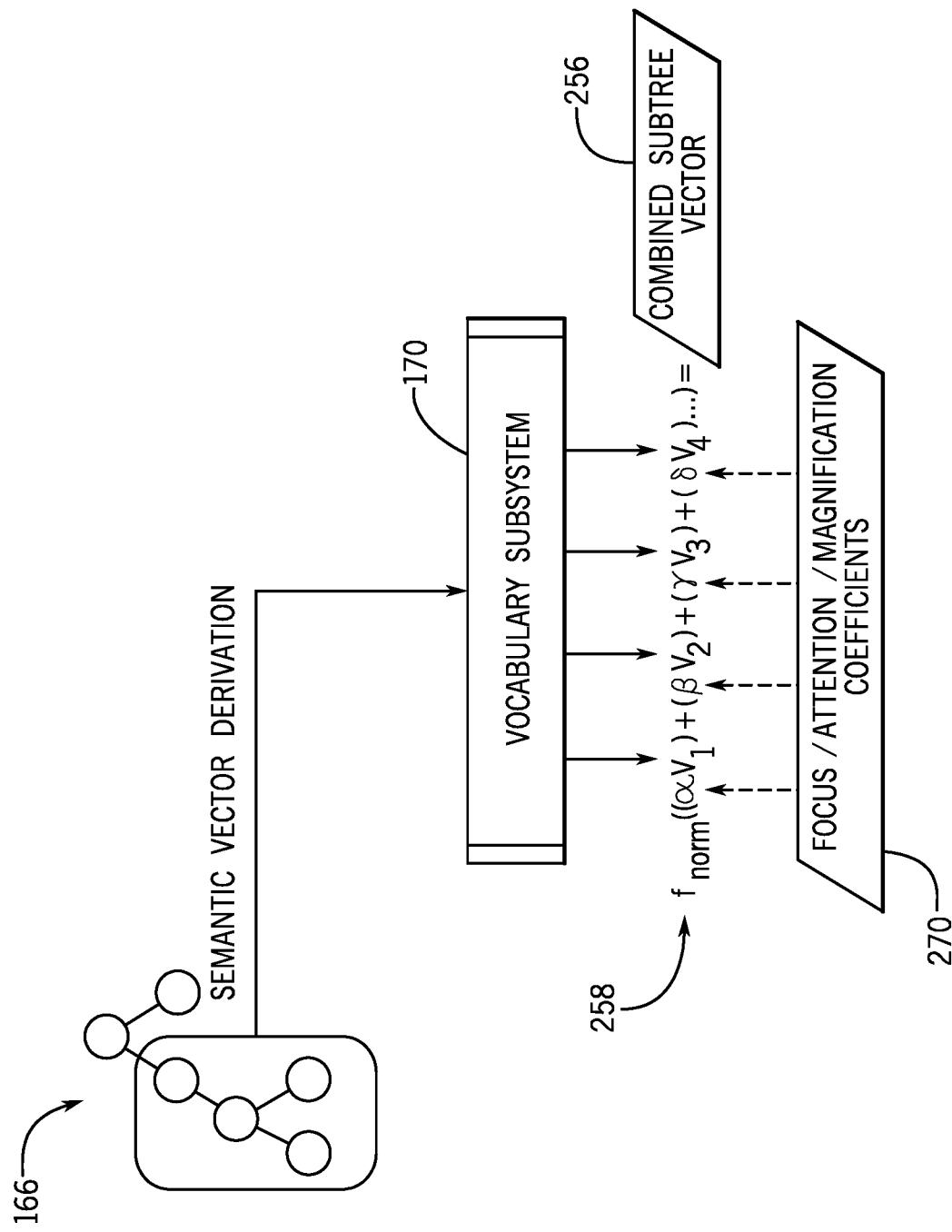
FIG. 11 is a block diagram illustrating example operation of an embodiment of a tree substructure vectorization algorithm to generate a combined subtree vector for a subtree of an annotated utterance tree, in accordance with aspects of the present technique.

FIG. 11 is a block diagram illustrating example operation of an embodiment of a tree substructure vectorization algorithm 258 to generate a subtree vector 256, which is part of the compilation unit triple 250 determined for subtrees of the annotated utterance tree 166, as discussed with respect to FIG. 9. As mentioned above, the vocabulary subsystem 170 provides word vectors for each node 202 of an annotated utterance tree 166. For the illustrated embodiment, the vocabulary subsystem 170 generated four or more word vectors, represented as $V_1$, $V_2$, $V_3$, and $V_4$, which are respectively associated with four nodes of the annotated utterance tree 166. That is, in certain embodiments, the NLU framework 104 may modify the annotated utterance tree 166 (e.g., the vocabulary subsystem 170 may replace individual words with phrasal equivalents, the structure subsystem 172 may expand contractions, and so forth), as discussed with respect to FIG. 8. As such, it is appreciated that, at one or more stages of intent/entity extraction, the number of nodes/subtrees of the annotated utterance tree 166 may be increased or decreased, along with the number of word vectors combined to calculate the subtree vector 256, relative to an original utterance or an initially generated annotated utterance tree 166.

As such, for the example illustrated in FIG. 11, the tree substructure vectorization algorithm 258 generates the subtree vector 256, by first multiplying each of the word vectors by a respective one (e.g., $\alpha$, $\beta$, $\gamma$, $\delta$) of the FAM coefficients 270, which increases or decreases the contribution of each word vector to the combined subtree vector 256. After applying the FAM coefficients 270 to the word vectors $V_{1-4}$, the results are combined using vector addition, as indicated by the "+" notation in FIG. 11. Additionally, for the illustrated embodiment, the resulting subtree vector 256 is subsequently normalized to ensure that the dimensions of the combined subtree vector are each within a suitable range after the multiplication and addition operations. It may be noted that the tree substructure vectorization algorithm 258 illustrated in FIG. 11 is merely provided as an example, and in other embodiments, other suitable tree substructure vectorization algorithms may be used, in accordance with the present disclosure.

By way of example, in certain embodiments, verb words or subtrees may be associated with one of the FAM coefficients 270 (e.g., a) that is greater in value than another FAM coefficient (e.g., $\beta$) associated with a subject or direct object word or subtree vector. In certain embodiments, root node word vectors may be associated with a relatively higher FAM coefficient 270 than word vectors associated with other nodes. In certain embodiments, the combined subtree vector 256 is a centroid that is calculated as the weighted average of the word vectors associated with all nodes of the subtree. In other embodiments, the meaning extraction subsystem 150 may recursively perform subtree vectorization to a predefined depth or until a particular node class is identified (e.g., a subject node, a modifier node). In certain embodiments, one or more of the vectors (e.g., $V_1$, $V_2$, $V_3$, and $V_4$) that are used to generate the combined subtree vector may itself be a combined subtree vector that is generated from other underlying word and/or subtree vectors. For such embodiments, subtrees with at least one depending node (e.g., non-leaf nodes/subtrees) may be associated with a higher FAM coefficient value than single-node (e.g., a leaf nodes/subtrees).

Figure 12:
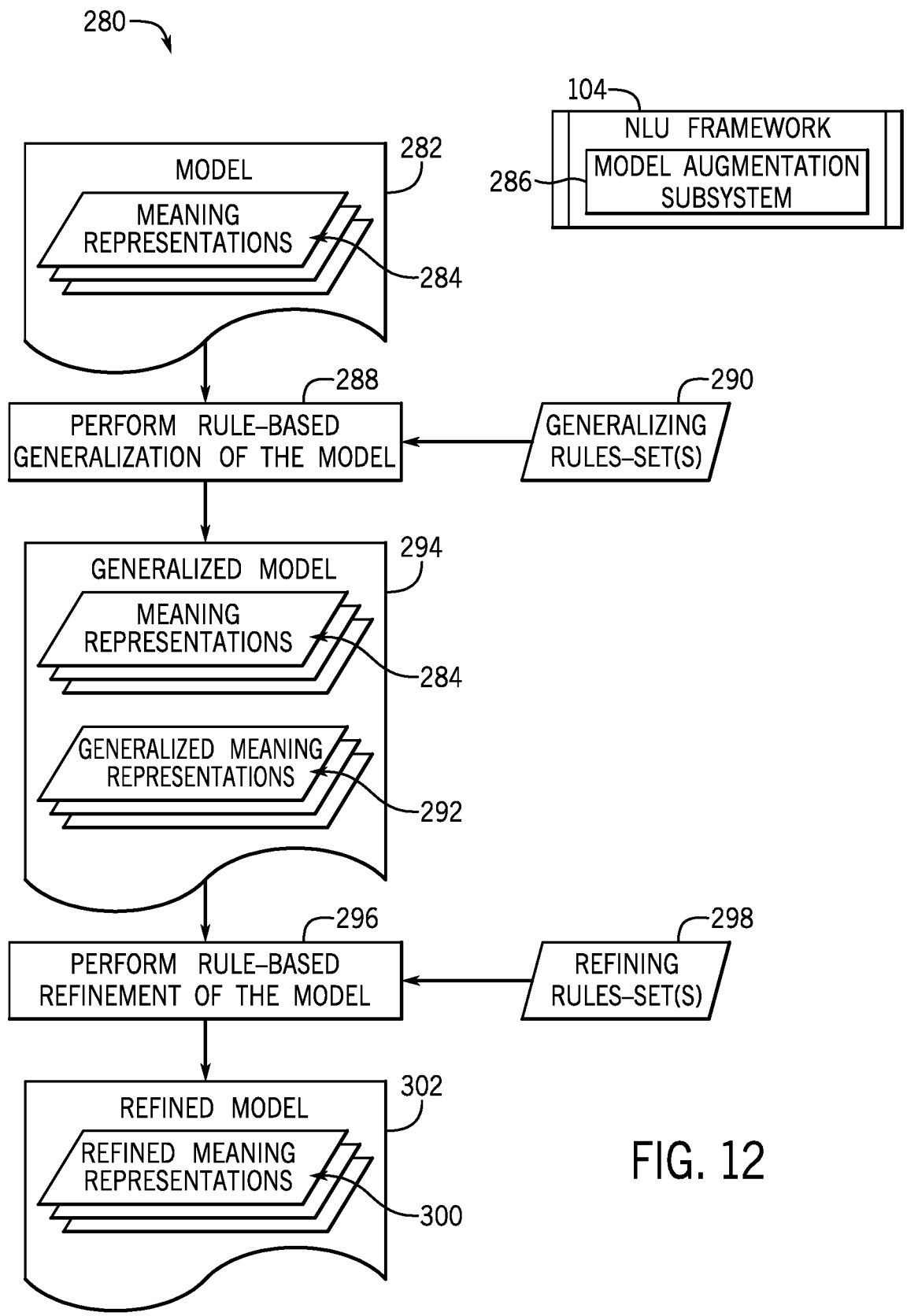
FIG. 12 is a flow diagram illustrating an example process by which a model augmentation subsystem of the NLU framework augments one or more models (e.g., the utterance meaning model, the understanding model, or a combination thereof) before performing a meaning search operation, in accordance with aspects of the present technique.

Once the meaning representations 158 and 162 have been generated, as illustrated in FIG. 5, the meaning search subsystem 152 can compare these meaning representations to extract intent/entities from the user utterance 122. However, in certain embodiments, the NLU framework 104 may first augment the utterance meaning model 160 and/or the understanding model 157 to improve the operation of the meaning search subsystem 152 to extract the intents/entities 140. For example, FIG. 12 is a flow diagram illustrating an embodiment of an augmentation process 280 whereby the NLU framework 104 augments a model 282 that includes one or more meaning representations 284. It should be noted that, in certain embodiments, the augmentation process 280 may be separately performed on the meaning representations 162 to augment the utterance meaning model 160, or the meaning representations 158 to augment the understanding model 157, or a combination thereof. For clarity, prior to augmentation, the model 282 may be referred to herein as an "original" model, and the one or more meaning representations 284 may be referred to herein as "original" meaning representations 284. The augmentation process 280 may be executed as part of a model augmentation subsystem 286, or another suitable subsystem, of the NLU framework 104. Additionally, the model augmentation subsystem 286 may cooperate with other subsystems (e.g., the vocabulary subsystem 170, the structure subsystem 172, and/or the prosody subsystem 174) of the NLU framework 104 to perform the augmentation process 280, as discussed below.

The embodiment of the augmentation process 280 illustrated in FIG. 12 begins with model augmentation subsystem 286 performing (block 288) a rule-based generalization of the model 282, which may be generated as discussed above. For example, based on one or more stored generalizing rule-sets 290, model augmentation subsystem 286 generates a plurality of generalized meaning representations 292 for at least a portion of the original meaning representations 284 of the model 282. As such, after the generalization step of block 288, the model 282 is expanded to include the generalized meaning representations 292, and the resulting model may be referred to herein as a generalized model 294 (e.g., a generalized utterance meaning model or a generalized understanding model). The generalized meaning representations 292 may be different structural permutations that are re-expressions of original meaning representations 284 and the underlying utterance. In general, the purpose of generalization is to expand the original model 282 to include additional forms related to the original meaning representations 284 already present in the model. It should be noted that, in certain embodiments, the augmentation process 280 only includes the generalization step of block 288. For such embodiments, the augmentation process 280 concludes at block 288 and the generalized model 294 serves as the augmented model (e.g., an augmented meaning model or an augmented understanding model) that is used for the subsequent meaning search operation.

For the embodiment illustrated in FIG. 12, the augmentation process 280 continues with the model augmentation subsystem 286 performing (block 296) a rule-based refinement of the generalized model 294 generated in block 288. For example, based on one or more stored refining rule-sets 298, the model augmentation subsystem 286 modifies or eliminates certain meaning representations (e.g., original meaning representations 284 and/or generalized meaning representations 292) of the generalized model 294. In general, the purpose of refinement is to adjust and focus the generalized model 294 to improve performance (e.g., improve domain specific performance, and/or reduce resource consumption) of the subsequent search operation by the meaning search subsystem 152. Upon completion of the rule-based refinement step of block 296, meaning representations 284 and/or 288 of the generalized model 294 are refined (e.g., modified and/or pruned) to generate refined meaning representations 300, and the resulting model may be referred to herein as a refined model 302 (e.g., a refined utterance meaning model or a refined understanding model).

For the illustrated embodiment, after both the generalization step of block 288 and the refining step of block 296, the resulting refined model 302 may be referred to as the augmented model (e.g., the augmented utterance meaning model or the augmented understanding model) that is used for the subsequent meaning search operation. It may be appreciated that, in certain embodiments, the generalization step of block 288 may be skipped, and augmentation process 280 may include performing the rule-based refinement of block 296 on the original meaning representations 284 of the original model 282 to generate the augmented model. Once the augmentation process 280 is complete, the meaning search subsystem 152 can instead use the augmented model (e.g., a generalized model, a refined model, or a generalized and refined model) as the utterance meaning model 160 or the understanding model 157 when extracting intent/entities from the user utterance 122, as illustrated and discussed with respect to FIG. 5.

Figure 13:
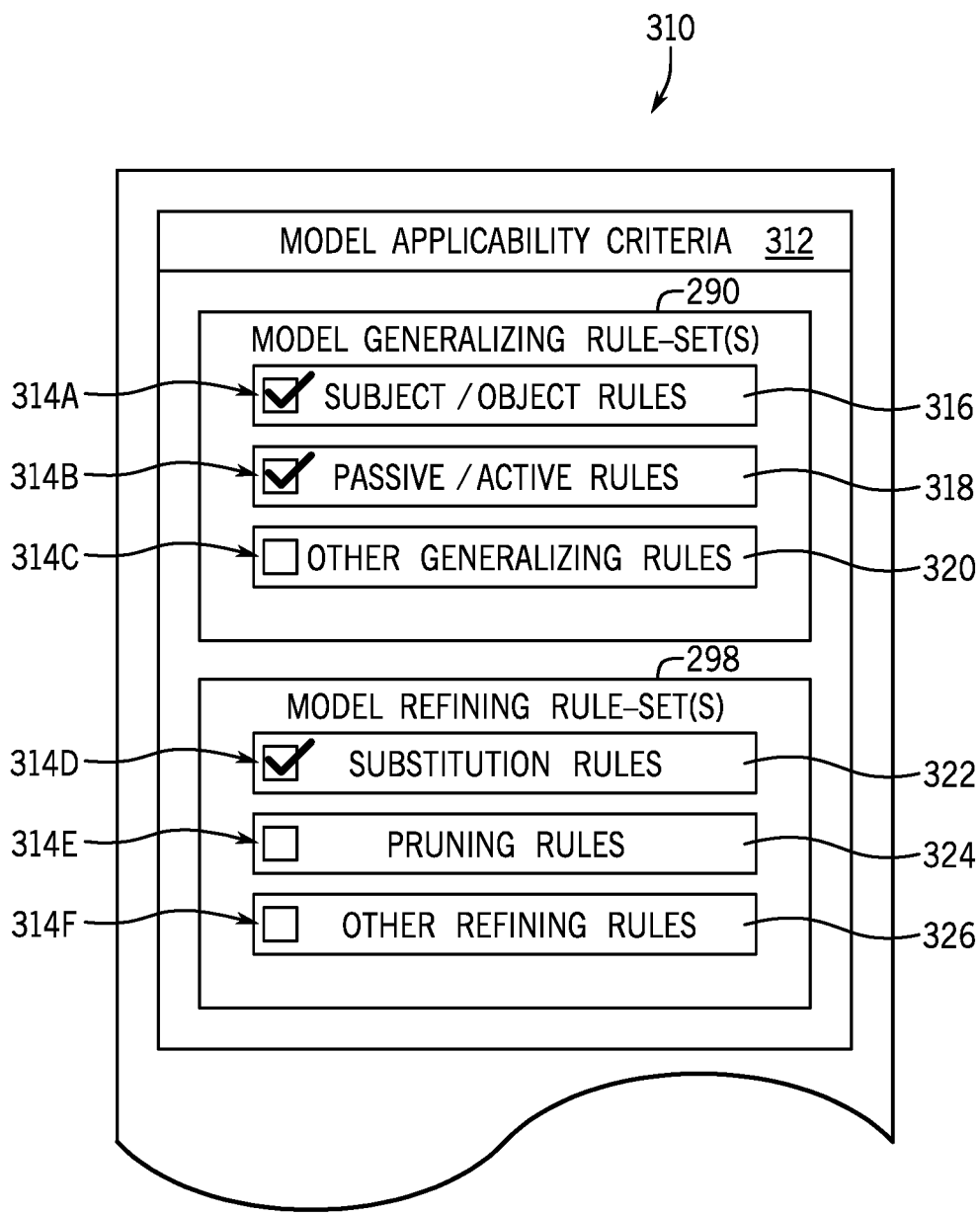
FIG. 13 is a diagram of an embodiment of a model augmentation template storing generalizing rule-sets, refining rule-sets, and model applicability criteria used by the model augmentation subsystem to augment the one or more models, in accordance with aspects of the present technique.

The aforementioned generalizing rule-sets 290 and refining rule-sets 298 generally define how the augmentation process 280 is performed to generate the augmented model. FIG. 13 illustrates an embodiment of a model augmentation template 310 that stores these generalizing rule-sets 290 and refining rule-sets 298, as well as model applicability criteria 312 that defines when and how these rule-sets are to be applied. In certain embodiments, the model augmentation template 310 may be stored as one or more tables of the database 106 illustrated in FIGS. 4A and 4B, or within another suitable data structure, in accordance with the present disclosure.

For the embodiment illustrated in FIG. 13, the model augmentation template 310 defines each rule of the generalizing rule-sets 290 and the refining rule-sets 298 based on particular model applicability criteria 312. That is, for the illustrated embodiment, particular rules of the generalizing rule-sets 290 and the refining rule-sets 298 can be selectively applied to or executed against certain meaning representations having particular characteristics, as defined by particular model applicability criteria 312. For example, the corresponding model applicability criteria 312 can indicate that particular generalizing rule-sets 290 and/or refining rule-sets 298 should only be applied when to certain types of models (e.g., the utterance meaning model 160 or the understanding model 157), or to certain meaning representations (e.g., having a particular form or shape, having particular nodes, having particular classes of nodes, having particular word vectors, having particular subtree vectors, and so forth). As such, the model applicability criteria 310 can include language-specific conditions, discourse-style conditions, and so forth, which govern when and how these rule-sets should be applied during the augmentation process 280. For the illustrated example, as indicated by the checkboxes 314 (e.g., checkboxes 314A, 314B, 314C, 314D, 314E, and 314F), only a portion of the generalizing rule-sets 290 and the refining rule-sets 298 have been activated for the augmentation process 280.

For the illustrated embodiment, the generalizing rule-sets 290 include subject/object rules 316, a passive/active rules 318, as well as other suitable generalizing rules 320. For example, the subject/object rules 316 may include a rule that consumes a meaning representation of a model and, from it, generates an alternative form of the meaning representation in which a subject and an object of the meaning representation (and of the underlying utterance) are interchanged. By way of specific example, one of the subject/object rules 316 may generate a meaning representation corresponding to the utterance, "She sent him the item" from a meaning representation corresponding to the utterance, "She sent the item to him." Similarly, the passive/active rules 318 may include a rule that consumes a meaning representation of a model and, from it, generates an alternative form of the meaning representation that has been converted from an active form to a passive form, or from a passive form to an active form. By way of specific example, the passive/active rule 318 may generate a meaning representation corresponding to the utterance, "I sent him the item" from a meaning representation corresponding to the utterance, "The item was sent to him." The other generalizing rules 320 may include any other grammatical rearrangement or transformation that generates a meaning representation having a similar (e.g., the same or closely related) meaning relative to an original meaning representation already present in the model.

For the illustrated embodiment, the refining rule-sets 298 include substitution rules 322, pruning rules 324, and any other suitable refining rules 326. For example, the one of the substitution rules 322 may define how constituent portions (e.g., nodes, subtrees, word vectors, subtree vectors) of a meaning representation of a model should be replaced with other substitute portions prior to performing the search operation. For example, one of the substitution rules 322 may identify two phrases having similar surface forms and different meanings, and substitute a portion (e.g., a subtree) of the original meaning representation representing the first phrase with a different portion (e.g., a replacement subtree) representing the second phrase. For example, the substituted structure may include fewer nodes or more nodes relative to the original meaning representation. As such, using substitution rules 322, certain word surface forms (e.g., words, acronyms, expressions, emojis, and so on) can be replaced with other word surface forms or phrasal forms that more common in a given conversation style, discourse, and/or domain. As such, it should be appreciated that the substitution rules 322, as well as other refining rules 326 expressed in the model augmentation template 310, can be used to capture local conversation style or subject vertical idiosyncrasies, as well as address nuances in word surface form, for example, in cases involving polysemy or other word-usage nuances.

By way of particular example, individually, the meanings of the words "look" and "up" are substantially different from the resulting meaning when used in combination ("look up"). As such, in an embodiment, a substitution rule 322 may locate every representation of the word "look" that is associated with the word "up" within the meaning representations of a model, and then substitute the corresponding structure with suitable structure (e.g., nodes, subtrees, word vectors, subtree vectors) that instead represent the term "look-up" or "search". For this example it may also be appreciated that, when performing comparisons during the later meaning search operation, "search" may be represented by a single tree node, while "look-up" may be represented by multiple tree nodes. As such, in certain cases, the substitution rule 322 can reduce the number of comparison operations and yield better match scores during the subsequent meaning search operation. However, it may be noted that, in certain embodiments, rather than locate and substitute specific words or phrases represented with the meaning representation, the substitution rule 322, as well as other rules defined in the model augmentation template 310, may instead rely on the shape of the meaning representation (e.g., the grammatical structure of the represented sentence or phrase) when applying generalizing and/or refining linguistic-rule-based manipulation, as set forth herein.

For the refining rule-set 298 illustrated in FIG. 13, the pruning rules 324 generally improve efficiency and reduce redundancy by removing sufficiently similar meaning representations from a model. As such, the pruning rules 324 may include a rule that defines a threshold level of similarity (e.g., in terms of similarity in structure, word vectors, and/or subtree vectors) that is acceptable between two meaning representations of a model, as well as which of the two meaning representations should be culled from the model. By way of particular example, one of the pruning rules 324 may identify two meaning representations (e.g., an original meaning representation and a generalized meaning representation, or two generalized meaning representations) that differ in limited ways (e.g., only in leaf nodes or in modifier nodes). In response, the rule may remove one of the two meaning representations from the model, reducing redundancy in the model and improving performance during the subsequent search operation. That is, by reducing the number of meaning representation of the utterance meaning model 160 and/or the understanding model 157, the memory footprint and the number of comparison operations of the subsequent meaning search operation can be substantially reduced, improving the performance of the NLU framework 104 and the agent automation system 100.

Figure 14:
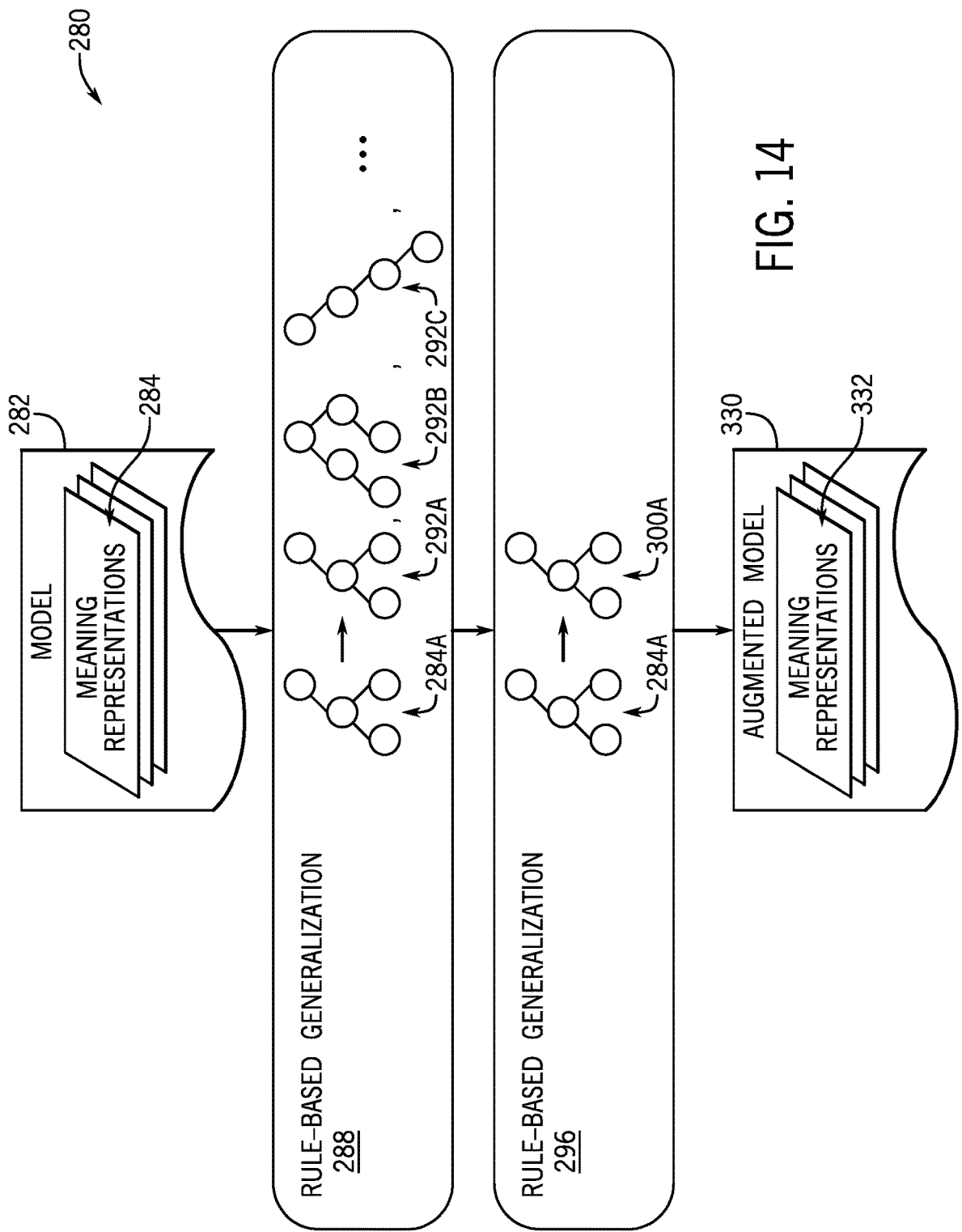
FIG. 14 is a diagram illustrating an embodiment of model augmentation in which meaning representations of the one or more models are generalized and/or refined to yield an augmented model, in accordance with aspects of the present technique.

FIG. 14 provides another depiction of the augmentation process 280 whereby one or more original meaning representations 284 of the original model 282 (e.g., meaning representations 162 of the utterance meaning model 160 or meaning representations 158 of the understanding model 157) are generalized and/or refined to yield an augmented model 330 having augmented meaning representations 332 (e.g., generalized and/or refined meaning representations). As set forth above, during rule-based generalization (block 288), the model augmentation subsystem 286 of the NLU framework 104 cooperates with the structure subsystem 172 of the NLU framework 104 to generate alternative forms of at least a portion of the meaning representations 284 based on one or more active generalization rule-sets 290. For the illustrated embodiment, the rule-based generalization of block 288 includes selectively applying subject/object rules 316, passive/active rules 318, and/or other suitable generalization rules 320 based on the model applicability criteria 312 that corresponds to these generalization rules. As such, the rule-based generalization of block 288 illustrates a single meaning representation 284A, which meets certain model applicability criteria 312 defined for one or more of the generalizing rule-sets 290, and which is used to generate at least generalized meaning representations 292A, 292B, and 292C based on the corresponding generalizing rule-sets 290.

For the embodiment illustrated in FIG. 14, during rule-based refining (block 288), the model augmentation subsystem 286 of the NLU framework 104 modifies the original meaning representation 284A of the model 282 based on one or more active refining rule-sets 298. In particular, for the illustrated embodiment, the model augmentation subsystem 286 cooperates with the vocabulary subsystem 170 of the NLU framework 104 to replace word vectors and subtree vectors associated with portions of the original meaning representation 284A with alternative word vectors and subtree vectors based on one or more active refining rule-sets 298. For the illustrated embodiment, the rule-based refining of block 296 includes applying substitution rules 322 and/or other suitable refining rules 326 based on the model applicability criteria 312 that corresponds to these refining rules. As such, the rule-based refinement of block 296 illustrates the original meaning representation 284A, which meets certain model applicability criteria 312 defined for one or more of the refining rule-sets 298, being used to generate the refined meaning representation 300A based on the corresponding refining rule-sets 298. In other embodiments, in block 296, the model augmentation subsystem 286 also removes or prunes one or more of the meaning representations of the model 282 (e.g., original meaning representations 284A, generalized meaning representations 292A, 292B, 292C) based on one or more active refining rule-sets 298. As mentioned, in certain embodiments, the steps of block 288 or 296 may be skipped, resulting in the augmented model 330 being only generalized or refined relative to the original model 282.

For embodiment illustrated in FIG. 14, relative to the original model 282, the augmented model 330 generally includes an expanded number of meaning representations 332, a reduction in redundancy within meaning representations 332, and/or an improvement in domain specificity. As such, when the original model 282 is the understanding model 157, then the augmented model 330 enables as an expanded and/or refined search space for the subsequent meaning search operation. When the original model 282 is the utterance meaning model 160, then the augmented model 330 may be described as an expanded and/or refined search key for the subsequent meaning search operation. As such, by augmenting the utterance meaning model 160 and/or understanding model 157, the meaning search subsystem 152 is more likely to correctly extract the intents/entities from received user utterances 122, as discussed above with respect to FIG. 5.

Figure 15:
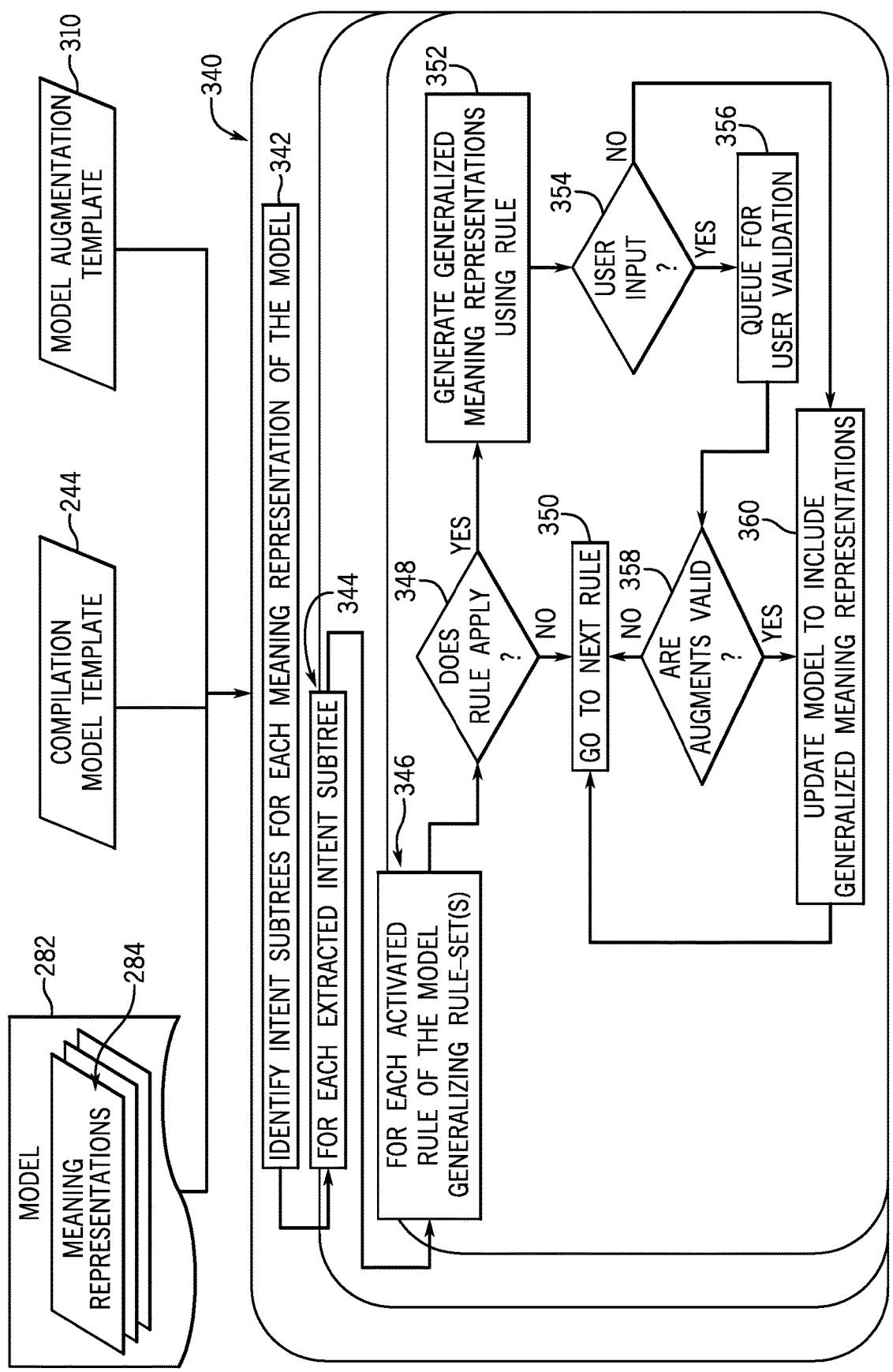
FIG. 15 is a flow diagram illustrating an embodiment of a process whereby the model augmentation subsystem performs rule-based generalization of the meaning representations of the one or more models, in accordance with aspects of the present technique.

FIG. 15 is a flow diagram illustrating an embodiment of a generalization process 340 whereby the model augmentation subsystem 286 of the NLU framework 104 performs rule-based generalization of the original meaning representations 284 of the original model 282. As mentioned, the original model 282 may be the utterance meaning model 160, including meaning representations 162, or the understanding model 157, including meaning representations 158, as illustrated in FIG. 5. The example generalization process 340 of FIG. 15 may be executed by the model augmentation subsystem 286 or another suitable subsystem of the NLU framework 104, and may involve the cooperation of other components (e.g., the structure subsystem 172 and the prosody subsystem 174) of the NLU framework 104. For the illustrated embodiment, the generalization process 340 receives the model 282 as an input, as well as the compilation model template 244 and the model augmentation template 310 discussed above.

The embodiment of the generalization process 340 illustrated in FIG. 15 begins with the model augmentation subsystem 286 identifying (block 342) intent subtrees for each of the meaning representations 284 of the model 282, wherein each intent subtree represents a distinct (e.g., atomic) intent of a particular meaning representation (as well as the underlying utterance). For example, in certain embodiments, the model augmentation subsystem 286 may invoke the prosody subsystem 174 to use one or more stored rules to segment the meaning representations 284 into distinct intent subtrees. Once all of the intent subtrees have been identified, the generalization process 340 includes an outer "for loop" (indicated by block 344) in which each of the intent subtrees are individually, serially processed. Within the outer "for loop" of block 344, there is an inner "for loop" (indicated by block 346) in which each of the activated rules of the generalizing rule-set(s) 290 of the model augmentation template 310 are conditionally or selectively applied, based on the corresponding model applicability criteria 312. In other words, the "for loops" associated with blocks 344 and 346 conditionally applies each activated rule of the generalizing rule-sets 290 to each intent subtree of the original meaning representations 284 of the model 282 as part of the generalization process.

Within the inner "for loop" indicated by block 346, the generalization process 340 includes the model augmentation subsystem 286 determining (decision block 348) whether the current activated generalizing rule (e.g., one of the subject/object rules 316 or passive/active rules 318) is applicable to the current intent subtree based on the model applicability criteria 312 of the model augmentation template 310, as discussed above with respect to FIG. 13. When the model augmentation subsystem 286 determines, based on the model applicability criteria 312, that the current rule does not apply, then it may proceed to the next rule in the "for loop" of block 346, as indicated by the block 350. When the model augmentation subsystem 286 determines, based on the model applicability criteria 312, that the current rule is applicable to the current intent subtree, the model augmentation subsystem 286 generates (block 352) one or more generalized meaning representations 292 from the current intent subtree based on the current generalization rule.

For the embodiment illustrated in FIG. 15, the generalization process 340 continues with the model augmentation subsystem 286 determining (decision block 354) whether a user should review and provide input to validate the generalized meaning representations 292 generated in block 352. For example, the model augmentation subsystem 286 may check the current generalization rule within the model augmentation template 310 to determine whether user validation and input should be sought. When the model augmentation subsystem 286 determines that user input should be requested, it queues (block 356) the generalized meaning representations 292 generated in block 352 for later user validation. When the model augmentation subsystem 286 eventually receives a valid response from the user (decision block 358), or when the model augmentation subsystem 286 determines in decision block 354 that user input is not involved with the current rule, then the model augmentation subsystem 286 responds by updating (block 360) the model 282 to include the generalized meaning representations 292 generated in block 352. In response to the model augmentation subsystem 286 receiving an invalid response from the user responding in decision block 358, or in response to the model augmentation subsystem 286 updating the model in block 360, the model augmentation subsystem 286 proceeds (block 350) to the next rule in the "for loop" of block 346.

Once the NLU framework 104 has processed each of the active rules of the generalization rule-set 290, the model augmentation subsystem 286 then proceeds to the next intent subtree of the "for loop" of block 344, and then repeats the "for loop" of block 346, which again conditionally applies each of the active model generalization rules-sets 290 against the next intent subtree based on the corresponding model applicability criteria 312. Accordingly, the illustrate generalization process 340 continues until all intent subtrees identified in block 342 have been processed in this manner to expand the model 282 into the generalized model 294 (e.g., a generalized utterance meaning model or a generalized understanding model). As mentioned, in certain embodiments, the generalized model 294 undergoes a subsequent refining step as a part of the augmentation process 280. However, in certain embodiments, the generalized model 294 produced by the generalization process 340 may not undergo a refining step, and the generalized model 294 serves as an augmented model 330 (e.g., an augmented utterance meaning model or an augmented understanding model) for the subsequent meaning search operation. In certain embodiments, the generalization process 340 is executed separately for both the utterance meaning model 160 and the understanding model 157 to expand both models prior to the meaning search operation.

Figure 16:
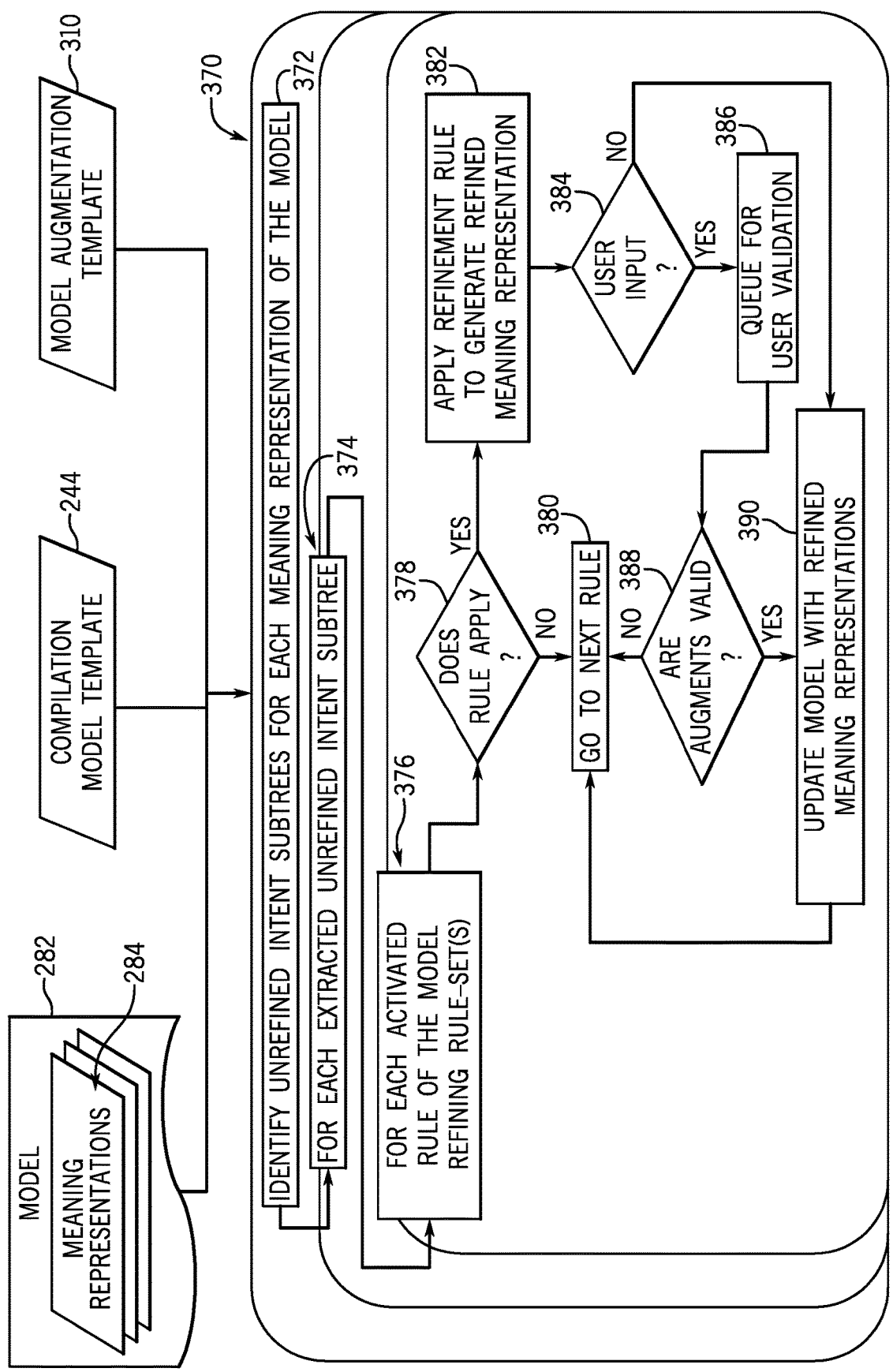
FIG. 16 is a flow diagram illustrating an embodiment of a process whereby the model augmentation subsystem performs rule-based refinement of the meaning representations of the one or more models, in accordance with aspects of the present technique.

FIG. 16 is a flow diagram illustrating an embodiment of a refinement process 370 whereby the model augmentation subsystem 286 performs rule-based refinement of the one or more meaning representations 284 of the model 282. As mentioned, in certain embodiments, the meaning representations 284 and the model 282 may be original meaning representations of an original (e.g., non-generalized, non-expanded) model 282 (e.g., the utterance meaning model 160 or the understanding model 157). In other embodiments, the model 282 may be the generalized model 294 (e.g., a generalized utterance meaning model or generalized understanding model) that is the product of the generalization process 340 of FIG. 15. The example refinement process 370 may be executed by the model augmentation subsystem 286 or anther suitable subsystem of the NLU framework 104, and may involve the cooperation of other components (e.g., the vocabulary subsystem 170, the structure subsystem 172, and the prosody subsystem 174) of the NLU framework 104. For the illustrated embodiment, the refinement process 370 receives the model 282 as an input, as well as the compilation model template 244 and the model augmentation template 310 discussed above.

The embodiment of the refinement process 370 illustrated in FIG. 16 begins with the model augmentation subsystem 286 identifying (block 372) unrefined intent subtrees for each of the meaning representations 284 of the model 282, wherein each unrefined intent subtree represents distinct (e.g., atomic) intents of meaning representations that have not been processed by the refining rule-sets 298. For example, in certain embodiments, the prosody subsystem 174 may use one or more stored rules to segment the meaning representations 284 into these intent subtrees. Once all of the unrefined intent subtrees have been identified, the refinement process 370 includes an outer "for loop" (indicated by block 374) in which each of the unrefined intent subtrees are individually processed. Within the outer "for loop" of block 374, there is an inner "for loop" (indicated by block 376) in which each of the activated rules of the refining rule-sets 298 of the model augmentation template 310 is selectively applied based on the model applicability criteria 312. In other words, the "for loops" associated with blocks 374 and 376 ensure that each activated rule of the refining rule-sets 298 can be conditionally or selectively applied to each intent subtree of the meaning representations 284 of the model 282 as part of the refinement process.

Within the inner "for loop" indicated by block 376, the refinement process 370 includes the model augmentation subsystem 286 determining (decision block 378) whether the current activated refining rule is applicable to the current intent subtree based on the model applicability criteria 312 of the model augmentation template 310, as discussed above with respect to FIG. 13. When the current rule does not apply, then the model augmentation subsystem 286 may proceed to the next refining rule in the "for loop" of block 376, as indicated by block 380. When the model augmentation subsystem 286 determines that the current refining rule is applicable to the current intent subtree, the model augmentation subsystem 286 applies (block 382) the current refinement rule to generate a refined meaning representation 300.

For the embodiment illustrated in FIG. 16, the refinement process 370 continues with the model augmentation subsystem 286 determining (decision block 384) whether a user should review and provide input to validate the refined meaning representation 300 generated in block 382. For example, the model augmentation subsystem 286 may check the current refinement rule within the model augmentation template 310 to determine whether user validation and input should be sought. When the model augmentation subsystem 286 determines that user input should be requested, it queues (block 386) the refined meaning representation generated in block 382 for later user validation. When the model augmentation subsystem 286 eventually receives a valid response from the user (decision block 388), or when the model augmentation subsystem 286 determines in decision block 384 that user input is not involved for the current refinement rule, then the model augmentation subsystem 286 responds by updating (block 390) the model 282 using the refined meaning representation 300 generated in block 382. In response to the model augmentation subsystem 286 receiving an invalid response from the user in decision block 358, or in response to the model augmentation subsystem 286 updating the model 282 in block 360, the model augmentation subsystem 286 proceeds (block 350) to the next rule the next rule in the inner "for loop" of block 346. As noted, the refined meaning representation 300 may include one or more substituted structural portions (e.g., different nodes, subtrees, or relative organization of nodes) and/or one or more substituted semantic portions (e.g., a vector, such as a word vector or subtree vector) relative to the meaning representations of the model 282 prior to the refinement process 370.

For the illustrated embodiment, once the model augmentation subsystem 286 has processed each of the active rules of the refining rule-set 298, it then proceeds to the next intent subtree of the outer "for loop" of block 374, and then repeats the "for loop" of block 376, which conditionally applies each of the active model refinement rules-sets 298 against the next intent subtree based on the corresponding model applicability criteria 312. The refinement process 370 continues until all intent subtrees identified in block 372 have been processed in this manner. As mentioned, in certain embodiments, after the refinement process 370, the resulting refined model 302 may serve as an augmented model 330 (e.g., an augmented utterance meaning model or an augmented understanding model) for the subsequent meaning search operation.

Technical effects of the present disclosure include providing an agent automation framework that is capable of extracting meaning from user utterances, such as requests received by a virtual agent (e.g., a chat agent), and suitably responding to these user utterances. The disclosed NLU framework includes a model augmentation subsystem capable of performing rule-based augmentation of an utterance meaning model and/or an understanding model, whereby the model is augmented by expanding and/or refining of the model based on a model augmentation template. For example, the disclosed NLU framework is capable of expanding a number of meaning representations in the model based on stored generalizing rules, wherein the additional meaning representations are re-expressions of the original meaning representations of the model. The disclosed NLU framework is also capable of refining the meaning representations of these models, for example, to remove substantially similar meaning representations based on stored refining rules, and to modify meaning representations to replace word surface or phrasal forms. As such, the disclosed technique enables the generation of an augmented understanding model and/or augmented utterance meaning model having generalized and/or refined meaning representations. By expanding and/or refining the understanding model and/or the utterance model, the disclosed augmentation techniques enable the NLU framework and the agent automation system to be more robust to variations in discourse styles and to nuances in word surface form and usage, and can also improve the operation of the NLU framework and agent automation system by reducing resource usage when deriving meaning from natural language utterances.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An agent automation system, comprising:
   at least one memory configured to store a set of generalizing rules and a model having one or more meaning representations, wherein each of the one or more meaning representations represents an utterance and includes one or more intent subtrees; and
   at least one processor configured to execute instructions to cause the agent automation system to perform a generalization process for each intent subtree of each meaning representation of the one or more meaning representations, the generalization process comprising:
   for each active generalizing rule of the set of generalizing rules:
   in response to determining that the active generalizing rule is applicable to the intent subtree of the meaning representation of the model:
   applying the active generalizing rule to generate a generalized meaning representation from the meaning representation; and
   updating the model to include the generalized meaning representation.

2. The system of claim 1, wherein the model is an understanding model and the one or more meaning representations comprise a plurality of meaning representations, each representing a sample utterance of an intent/entity model.

3. The system of claim 1, wherein the model is an utterance meaning model and the one or more meaning representations each represent a portion of a received user utterance.

4. The system of claim 1, wherein the generalization process comprises:
   extracting the one or more intent subtrees of the one or more meaning representations of the model.

5. The system of claim 1, wherein the set of generalizing rules comprise a subject/object rule configured to interchange a subject and an object of the meaning representation to generate the generalized meaning representation.

6. The system of claim 1, wherein the set of generalizing rules comprise a passive/active rule configured to convert the meaning representation from passive to active, or from active to passive, to generate the generalized meaning representation.

7. The system of claim 1, wherein the at least one memory is configured to store a set of refining rules and the at least one processor is configured to execute the instructions to cause the agent automation system to perform a refining process for each intent subtree of each meaning representation of the one or more meaning representations and each generalized meaning representation of the model, the refining process comprising:
for each active refining rule of the set of refining rules:
in response to determining that the active refining rule is applicable to the intent subtree of the meaning representation of the model:
applying the active refining rule to generate a refined meaning representation from the meaning representation, to determine that the meaning representation should be removed, or a combination thereof, and
updating the model to include the refined meaning representation, to remove the meaning representation, or a combination thereof.

8. The system of claim 7, wherein the set of refining rules comprise a substitution rule configured to replace a portion of the meaning representation when generating the refined meaning representation.

9. The system of claim 8, wherein the portion comprises one or nodes, one or more subtrees, one or more word vectors, one or more subtree vectors, or a combination thereof.

10. The system of claim 7, wherein the set of refining rules comprise a pruning rule configured to determine that the meaning representation should be removed when the meaning representation is within a threshold similarity of another meaning representation of the model.

11. The system of claim 7, wherein the at least one processor is configured to execute the instructions to cause the agent automation system to, after performing the generalizing process and the refining process, perform actions comprising:
generating at least one meaning representation for a received user utterance; and
searching the at least one meaning representation of the received user utterance within one or more meaning representations, generalized meaning representations, and/or refined meaning representations of the model to extract intents/entities from the received user utterance.

12. A method of operating an agent automation system, comprising:
performing a generalizing process for each intent subtree of each meaning representation of one or more meaning representations of a model, the generalizing process comprising:
for each active generalizing rule of a set of generalizing rules:
in response to determining that the active generalizing rule is applicable to the intent subtree of the meaning representation of the model:
applying the active generalizing rule to generate a generalized meaning representation from the meaning representation; and
updating the model to include the generalized meaning representation.

13. The method of claim 12, wherein the generalization process comprises:
after generating the generalized meaning representation, in response to determining that the active generalizing rule indicates that a user should review the generalized meaning representation, queuing the generalized meaning representation for user review and awaiting user input before updating the model to include the generalized meaning representation.

14. The method of claim 12, comprising:
performing a refining process for each intent subtree of each meaning representation of the one or more meaning representations and each generalized meaning representation of the model, the refining process comprising:
for each active refining rule of the set of refining rules:
in response to determining that the active refining rule is applicable to the intent subtree of the meaning representation of the model:
applying the active refining rule to generate a refined meaning representation from the meaning representation, to determine that the meaning representation should be removed, or a combination thereof; and
updating the model to include the refined meaning representation, to remove the meaning representation, or a combination thereof.

15. The method of claim 14, wherein the refining process comprises:
after generating the refined meaning representation, in response to determining that the active refining rule indicates that a user should review the refined meaning representation, queuing the refined meaning representation for user review and awaiting user input before updating the model to include the refined meaning representation.

16. A non-transitory, computer-readable medium storing instructions that are executable by a processor of an agent automation system, the instructions comprising instructions to:
perform a generalizing process for each intent subtree of each meaning representation of one or more meaning representations of a model, the generalizing process comprising:
for each active generalizing rule of a set of generalizing rules:
in response to determining that the active generalizing rule is applicable to the intent subtree of the meaning representation of the model:
apply the active generalizing rule to generate a generalized meaning representation from the meaning representation; and
update the model to include the generalized meaning representation.

17. The medium of claim 16, comprising instructions to determine whether the active generalizing rule is applicable comprise instructions by:
determining whether the active generalizing rule is applicable to the model, to a particular form of the meaning representation, and to a particular form of the intent subtree.

18. The medium of claim 16, wherein the set of generalizing rules comprise:

a subject/object rule configured to interchange a subject and an object of the meaning representation to generate the generalized meaning representation; and a passive/active rule configured to convert the meaning representation from passive to active, or from active to passive, to generate the generalized meaning representation.

19. The medium of claim 16, wherein the instructions comprise instructions to:

after performing the generalizing process, perform a refining process for each intent subtree of each meaning representation of the one or more meaning representations and each generalized meaning representation of the model, the refining process comprising:

for each active refining rule of a set of refining rules:

in response to determining that the active refining rule is applicable to the intent subtree of the meaning representation of the model:

applying the active refining rule to generate a refined meaning representation from the meaning representation, to determine that the meaning representation should be removed, or a combination thereof; and updating the model to include the refined meaning representation, to remove the meaning representation, or a combination thereof.

20. The medium of claim 19, wherein the set of refining rules comprise:

a substitution rule configured to replace a portion of the meaning representation when generating the refined meaning representation, wherein the portion comprises one or nodes, one or more subtrees, one or more word vectors, one or more subtree vectors, or a combination thereof; and a pruning rule configured to determine that the meaning representation should be removed when the meaning representation is within a threshold similarity of another meaning representation of the model.

* * * * *